US012574650B2

(12) United States Patent
Yamasaki et al.

(10) Patent No.: US 12,574,650 B2
(45) Date of Patent: Mar. 10, 2026

(54) IMAGING APPARATUS WITH LOCALIZED EXPOSURE COMPENSATION

(71) Applicant: Panasonic Intellectual Property Management Co., Ltd., Osaka (JP)

(72) Inventors: Takaaki Yamasaki, Osaka (JP); Shinichi Yamamoto, Osaka (JP); Motonori Ogura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 44 days.

(21) Appl. No.: 18/742,616

(22) Filed: Jun. 13, 2024

(65) Prior Publication Data

US 2024/0430581 A1 Dec. 26, 2024

(30) Foreign Application Priority Data

Jun. 23, 2023 (JP) ................................. 2023-103204

(51) Int. Cl.
*H04N 23/75* (2023.01)
*H04N 23/611* (2023.01)
*H04N 23/71* (2023.01)

(52) U.S. Cl.
CPC ........... *H04N 23/75* (2023.01); *H04N 23/611* (2023.01); *H04N 23/71* (2023.01)

(58) Field of Classification Search
CPC ....... H04N 23/75; H04N 23/611; H04N 23/71
(Continued)

(56) References Cited

U.S. PATENT DOCUMENTS 6,072,526 A * 6/2000 Hashimoto ............ H04N 9/643
348/E9.04
6,940,545 B1 * 9/2005 Ray ...................... H04N 23/611
348/222.1
(Continued)

FOREIGN PATENT DOCUMENTS

JP H05-041830 A 2/1993
JP 2844894 B 1/1999
(Continued)

OTHER PUBLICATIONS

Atsushi Marugame, Shizuo Sakamoto, "Face Feature Extraction in 3D Range Data with Shape and Color," Proceedings of General Sessions of Forum on Information Technology, Japan, 2002 (3), pp. 199-200, Sep. 13, 2002.
(Continued)

*Primary Examiner* — Usman A Khan
(74) *Attorney, Agent, or Firm* — Renner, Otto, Boisselle & Sklar, LLP

(57) ABSTRACT

An imaging apparatus includes: an image sensor that captures a subject image by receiving incident light to generate image data; an adjuster that adjusts a light reception rate in each position on an incident surface entered by the light and corresponding to an image indicated by the image data, the light reception rate allowing the image sensor to receive the light; a detector that detects a skin region corresponding to a part with skin of a subject indicated by the subject image in the image; and a controller that controls the adjuster to render the light reception rate in a position corresponding to a part of the image on the incident surface different from the light reception rate in another position thereon, wherein the controller compensates exposure of a part corresponding to the skin region detected by the detector to bring luminance in the skin region within a predetermined range.

9 Claims, 14 Drawing Sheets

(58) Field of Classification Search
USPC ....................................................... 348/216.1
See application file for complete search history.

(56) References Cited

U.S. PATENT DOCUMENTS

| | | | | |
|---|---|---|---|---|
| 7,796,831 | B2 * | 9/2010 | Tanaka .................... | H04N 23/88 |
| | | | | 396/164 |
| 8,384,793 | B2 * | 2/2013 | Ciuc ........................ | G06T 11/60 |
| | | | | 348/222.1 |
| 8,494,357 | B2 * | 7/2013 | Brunner ................. | H04N 23/62 |
| | | | | 396/233 |
| 9,516,217 | B2 * | 12/2016 | Corcoran ............. | A61B 5/1176 |
| 2013/0016249 | A1 * | 1/2013 | Mine ...................... | H04N 23/74 |
| | | | | 348/E9.051 |
| 2018/0255207 | A1 | 9/2018 | Sato et al. | |
| 2019/0098224 | A1 | 3/2019 | Kobayashi et al. | |
| 2019/0377969 | A1 * | 12/2019 | Kuo ........................ | G06V 40/16 |
| 2020/0099867 | A1 * | 3/2020 | Sugimoto ............. | G03B 11/00 |
| 2020/0186791 | A1 | 6/2020 | Nakagawa et al. | |
| 2021/0105413 | A1 * | 4/2021 | Suzuki ................. | H04N 23/675 |
| 2023/0326163 | A1 * | 10/2023 | Yamasaki ............. | G06V 10/25 |
| | | | | 348/370 |

FOREIGN PATENT DOCUMENTS

| | | |
|---|---|---|
| JP | 2007-208610 A | 8/2007 |
| JP | 2010-026018 A | 2/2010 |
| JP | 2018-146949 A | 9/2018 |
| JP | 2019-68402 A | 4/2019 |
| JP | 2020-095120 A | 6/2020 |
| JP | 2021-018081 A | 2/2021 |
| WO | 2018-235384 A1 | 12/2018 |

OTHER PUBLICATIONS

H. Zhou, S. Hadap, K. Sunkavalli and D. Jacobs, "Deep Single-Image Portrait Relighting," 2019 IEEE/CVF International Conference on Computer Vision (ICCV), Seoul, Korea (South), 2019, pp. 7193-7201, doi: 10.1109/ICCV. 2019.00729.

* cited by examiner

ADJUST TRANSMITTANCE

EXPOSURE COMPENSATION FOR FACE REGION

*Fig. 6*

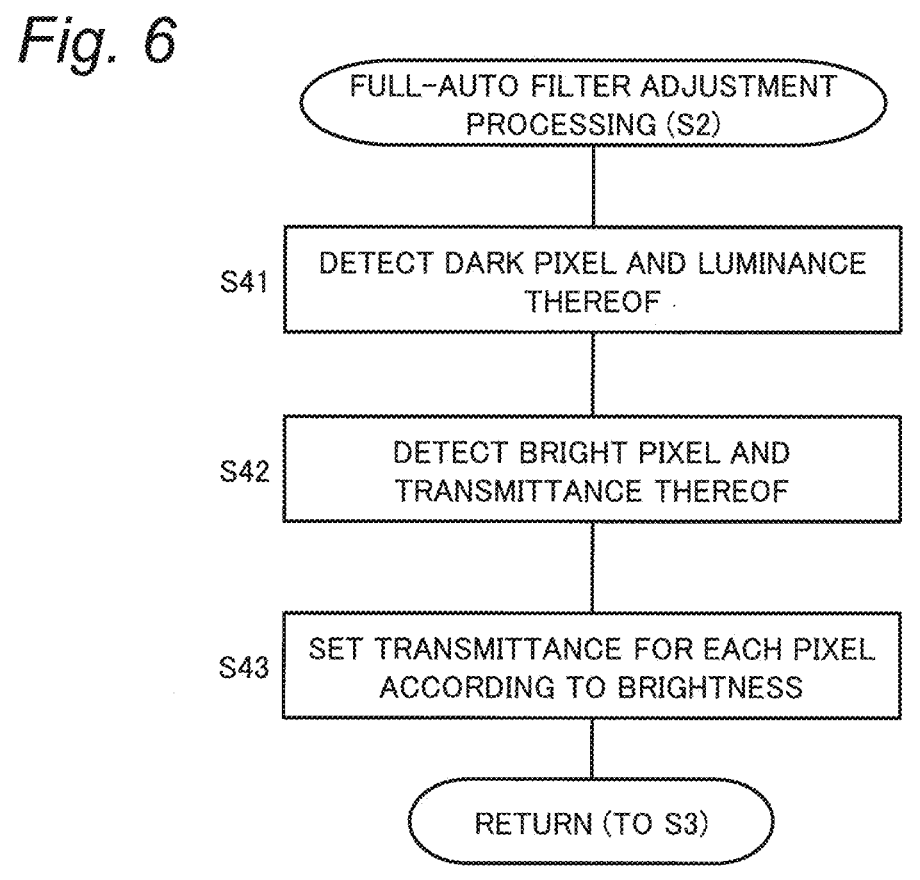

```
        ╭─────────────────────────────────╮
        │   FULL-AUTO FILTER ADJUSTMENT    │
        │        PROCESSING (S2)           │
        ╰─────────────────────────────────╯
                        │
        ┌─────────────────────────────────┐
   S41  │  DETECT DARK PIXEL AND LUMINANCE │
        │            THEREOF               │
        └─────────────────────────────────┘
                        │
        ┌─────────────────────────────────┐
   S42  │     DETECT BRIGHT PIXEL AND      │
        │     TRANSMITTANCE THEREOF        │
        └─────────────────────────────────┘
                        │
        ┌─────────────────────────────────┐
   S43  │ SET TRANSMITTANCE FOR EACH PIXEL │
        │   ACCORDING TO BRIGHTNESS        │
        └─────────────────────────────────┘
                        │
            ╭───────────────────────╮
            │    RETURN (TO S3)     │
            ╰───────────────────────╯
```

IMAGING APPARATUS WITH LOCALIZED EXPOSURE COMPENSATION

TECHNICAL FIELD

The present disclosure relates to an imaging apparatus capable of adjusting a ratio with which light for capturing a subject image is received.

BACKGROUND ART

WO 2018/235384 A1 discloses an image capturing apparatus including a neutral density (ND) filter having a plurality of light transmittances. The image capturing apparatus changes the voltage applied to the ND filter to control the transmittance of the ND filter, thereby control the exposure of a photographic subject image. The image capturing apparatus of WO 2018/235384 A1 controls exposure for each of a plurality of regions set by dividing a live preview image along a boundary line, and adjusts, when the live preview image changes, the determined position of the boundary line based on the change in the image. According to the image capturing apparatus of WO 2018/235384 A1, it is intended to easily set regions for which exposure is controlled.

RELATED ARTS

Non-Patent Document 1: Atsushi Marugame, Shizuo Sakamoto, "Face Feature Extraction in 3D Range Data with Shape and Color," Proceedings of General Sessions of Forum on Information Technology, Japan, 2002 (3), pp. 199-200, 2002 Sep. 13.

Non-Patent Document 2: H. Zhou, S. Hadap, K. Sunkavalli and D. Jacobs, "Deep Single-Image Portrait Relighting," 2019 IEEE/CVF International Conference on Computer Vision (ICCV), Seoul, Korea (South), 2019, pp. 7193-7201, doi: 10.1109/ICCV. 2019.00729.

SUMMARY

The present disclosure provides an imaging apparatus capable of adjusting brightness according to a subject in an image to be captured.

An imaging apparatus according to the present disclosure includes an image sensor, an adjuster, a detector, and a controller. The image sensor captures a subject image by receiving incident light to generate image data. The adjuster adjusts a light reception rate in each position on an incident surface, the light reception rate allowing the image sensor to receive the light, the incident surface being entered by the light and corresponding to an image indicated by the image data. The detector detects a skin region in the image, the skin region corresponding to a part with skin of a subject indicated by the subject image. The controller controls the adjuster to render the light reception rate in a position corresponding to a part of the image on the incident surface different from the light reception rate in another position thereon. The controller compensates exposure of a part corresponding to the skin region detected by the detector to bring luminance in the skin region within a predetermined range.

According to the imaging apparatus of the present disclosure, brightness can be adjusted according to a subject in an image to be captured.

BRIEF DESCRIPTION OF DRAWINGS

FIG. 6 is a flowchart illustrating full-auto filter adjustment processing in the digital camera;

DETAILED DESCRIPTION

Hereinafter, embodiments will be described in detail with reference to the drawings as appropriate. However, a detailed description more than necessary may be omitted. It should be noted that the accompanying drawings and the following description are provided for a person skilled in the art to fully understand the present disclosure. Thus, the drawings and the description are not intended to limit the subject matter defined in the claims.

First Embodiment

In the first embodiment, a digital camera as an example of the imaging apparatus according to the present disclosure will be described.

1. Configuration

A configuration of a digital camera according to the first embodiment will be described with reference to FIGS. 1 to 2.

Figure 1:
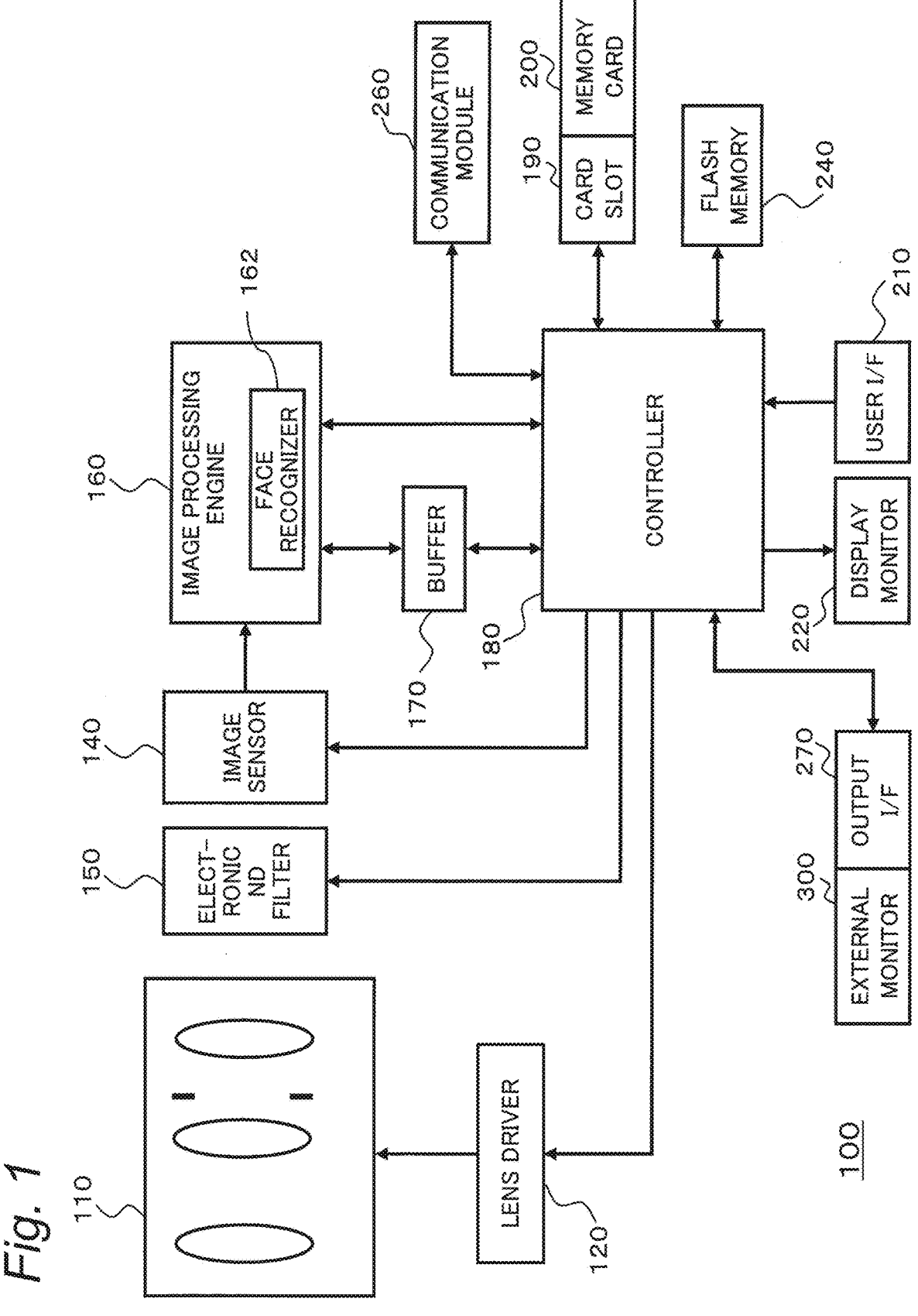
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an optical system 110, a lens driver 120, an image sensor 140, and an electronic neutral density (ND) filter 150. Furthermore, the digital camera 100 includes an image processor 160, a buffer memory 170, a controller 180, a user interface 210, and a display monitor 220. Furthermore, the digital camera 100 includes a flash memory 240, a card slot 190, a communication module 260, and an output interface 270.

The optical system 110 includes a zoom lens, a focus lens, a diaphragm, and the like. The zoom lens is a lens for changing the magnification of the subject image formed by the optical system. The focus lens is a lens for changing the focus state of the subject image formed on the image sensor 140. The zoom lens and the focus lens include one or more lenses.

The lens driver 120 includes a configuration for driving various lenses of the optical system 110 such as a focus lens. For example, the lens driver 120 includes a motor, and moves the focus lens along the optical axis of the optical system 110 based on control of the controller 180. The configuration for driving the focus lens in the lens driver 120 can be implemented with a DC motor, a stepping motor, a servo motor, an ultrasonic motor, or the like.

The image sensor 140 captures a subject image incident through the optical system 110 to generate image data. The image data generated by the image sensor 140 is input to the image processor 160.

The image sensor 140 generates image data on a new frame at a predetermined frame rate (e.g., 30 frames/second). The imaging data generation timing and electronic shutter operation in the image sensor 140 are controlled by the controller 180. As the image sensor 140, various image sensors such as a CMOS image sensor, a CCD image sensor, or an NMOS image sensor can be used.

The image sensor 140 executes an imaging operation of a moving image or a still image, an imaging operation of a through image, and the like. The through image is mainly a moving image, and is displayed on the display monitor 220 for the user to determine the composition. The image sensor 140 is an example of the image sensor in the present embodiment.

The electronic ND filter 150 is a filter element in which transmittance of light such as visible light can be changed by electronic control, and is configured from various physical property elements such as a liquid crystal element or an electrochromic element. The electronic ND filter 150 is arranged, for example, between the optical system 110 and the image sensor 140. The electronic ND filter 150 of the present embodiment is configured to be capable of changing the transmittance in each position of a predetermined unit on the incident surface on which the light is incident. A configuration example of the electronic ND filter 150 in the present embodiment is illustrated in FIG. 2.

Figure 2:
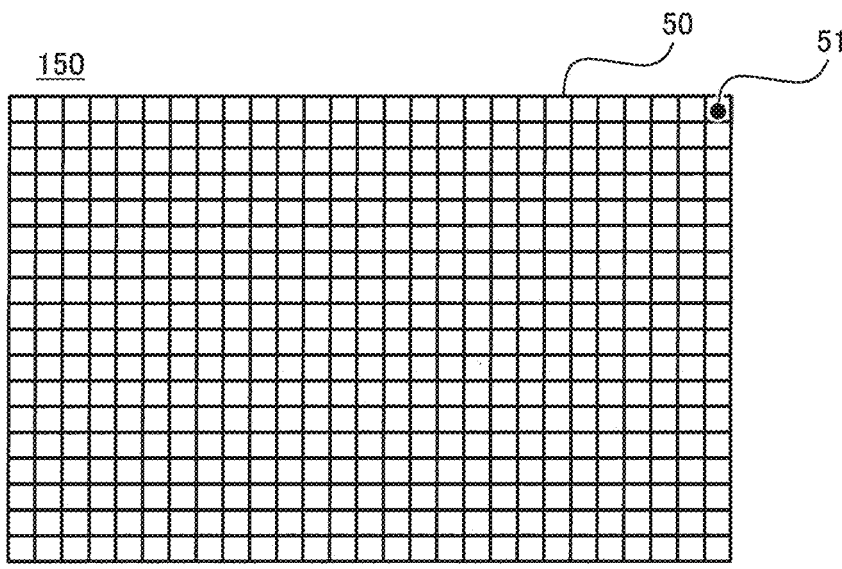
FIG. 2 is a diagram illustrating a configuration of an electronic ND filter in the digital camera of the first embodiment.

As shown in FIG. 2, for example, the electronic ND filter 150 in the present embodiment has an incident surface 50 on which a plurality of pixels 51 are arranged in a two-dimensional array. The electronic ND filter 150 is positioned with respect to the image sensor 140 so that each pixel 51 of the electronic ND filter 150 on the incident surface 50 corresponds to a predetermined number (one or a plurality) of pixels on the imaging surface in the image sensor 140, via light incident from the optical system 110.

In the electronic ND filter 150 of the present embodiment, a liquid crystal element is sealed between a plurality of glass substrates. The electronic ND filter 150 can independently adjust the transmittance of light incident for each region (in each position) on the incident surface 50 in units of pixels 51 as region units. On the incident surface 50 of the electronic ND filter 150, a transparent electrode (not shown) corresponding to each region is arranged on a glass substrate so that the transmittance can be independently controlled for each region, and the transmittance of each of the plurality of pixels 51 can be independently adjusted by setting a drive voltage for each region by a drive circuit (not shown). The electronic ND filter 150 is an example of an adjuster that adjusts the transmittance as an example of the light reception rate.

Returning to FIG. 1, the image processor 160 performs predetermined processing on the image signal output from the image sensor 140 to generate image data or performs various processing on the image data to generate an image for being displayed on the display monitor 220. The predetermined processing includes white balance correction, gamma correction, YC conversion processing, electronic zoom processing, compression processing, expansion processing, and the like, but is not limited to these. The image processor 160 may include a hard-wired electronic circuit or may include a microcomputer, a processor, or the like, which uses a program.

The image processor 160 of the present embodiment includes a face recognizer 162 that implements a function to detect a subject such as a human face by image recognition of a captured image (e.g., a through image) captured by the image sensor 140.

The face recognizer 162 performs face detection using a trained model implemented by a neural network such as a convolutional neural network. The face recognizer 162 recognizes a face region indicating a region in which a face appears in the captured image by face detection. The face recognizer 162 generates detection information indicating a detection result of the face region, and outputs the detection information to the controller 180, for example.

In the present embodiment, the trained model of the face recognizer 162 is generated by machine learning to perform region distinction for distinguishing between a region in which a face appears and another region in an image, for example. The face region may include a part where the skin such as the neck appears, for example. Such a trained model can be obtained by supervised machine learning using, for example, image data to which a label for distinguishing a region in an image is assigned for each pixel as training data. The trained model of the face recognizer 162 is not limited to the neural network and may be a machine learning model for various types of image recognition. The face detection by the face recognizer 162 may be performed by various image recognition algorithms such as rule-based image recognition processing such as template matching.

The detection information output from the face recognizer 162 includes, for example, the position of a pixel corresponding to the face region in the captured image. When face regions corresponding to a plurality of subjects are detected, the detection information may include information such as subject IDs each associating the face region with the subject.

The face recognizer 162 may be configured separately from the image processor 160, or may be configured integrally with the controller 180. In addition, the face recognizer 162 may perform face detection for an animal as a subject, not limited to a person, for example.

The buffer memory 170 is a recording medium that functions as a work memory for the image processor 160 and the controller 180. The buffer memory 170 is implemented with a dynamic random-access memory (DRAM) or the like. The flash memory 240 is a non-volatile recording medium. Each of the memories 170 and 240 is an example of a storage unit in the present embodiment.

The controller 180 controls the overall operation of the digital camera 100. The controller 180 uses the buffer memory 170 as a work memory during a control operation or an image processing operation.

The controller 180 includes a CPU or an MPU and achieves a predetermined function by executing a program (software) by the CPU or MPU. The controller 180 may include a processor including a dedicated electronic circuit designed to implement a predetermined function instead of the CPU or the like. That is, the controller 180 can be implemented with various processors such as a CPU, an MPU, a GPU, a DSU, an FPGA, and an ASIC. The controller 180 may include one or more processors.

The card slot 190 can mount the memory card 200, and accesses the memory card 200 based on the control from the controller 180. The digital camera 100 can record image data on the memory card 200 and read the recorded image data from the memory card 200.

The user I/F 210 is a generic term for operation members that receive an operation (instruction) from a user. The user I/F 210 includes buttons, levers, dials, touch panels, joysticks, switches, and the like that receive user operations, and includes, for example, direction keys, decision buttons, shutter buttons, moving image recording buttons, function buttons, and the like. In addition, the user I/F 210 may also include virtual buttons and icons displayed on the display monitor 220 or the like.

The display monitor 220 is an example of a display that displays various types of information. For example, the display monitor 220 displays an image (through image) indicated by image data which is captured by the image sensor 140 and subjected to image processing by the image processor 160. In addition, the display monitor 220 displays a menu screen or the like for a user to perform various settings on the digital camera 100. The display monitor 220 can include a liquid crystal display device or an organic EL device, for example.

The communication module 260 is a communication module (circuit) that performs communication conforming to the communication standard IEEE 802.11, Wi-Fi standard, or the like. The digital camera 100 may communicate directly with other apparatuses through the communication module 260 or may communicate via an access point. The communication module 260 may be connectable to a communication network such as the Internet.

The output interface 270 is a circuit to output information based on control from the controller 180. Hereinafter, the interface is abbreviated as "I/F". For example, the output I/F 270 is connected to the external monitor 300, and outputs image data or the like indicating a through image to the external monitor 300, in conformity with the HDMI (registered trademark) standard or the like. The external monitor 300 is an example of an external display device to display various types of information.

2. Operation

The operation of the digital camera 100 configured as described above will be described in the following. The digital camera 100 of the present embodiment has a function to photograph (shoot) an image partially dimmed or brightened by the electronic ND filter 150 in various photographing scenes desired by the user. Hereinafter, an overview of the operation of the digital camera 100 will be described.

2-1. Overview of Operation

Figures 3A, 3B, 3C:
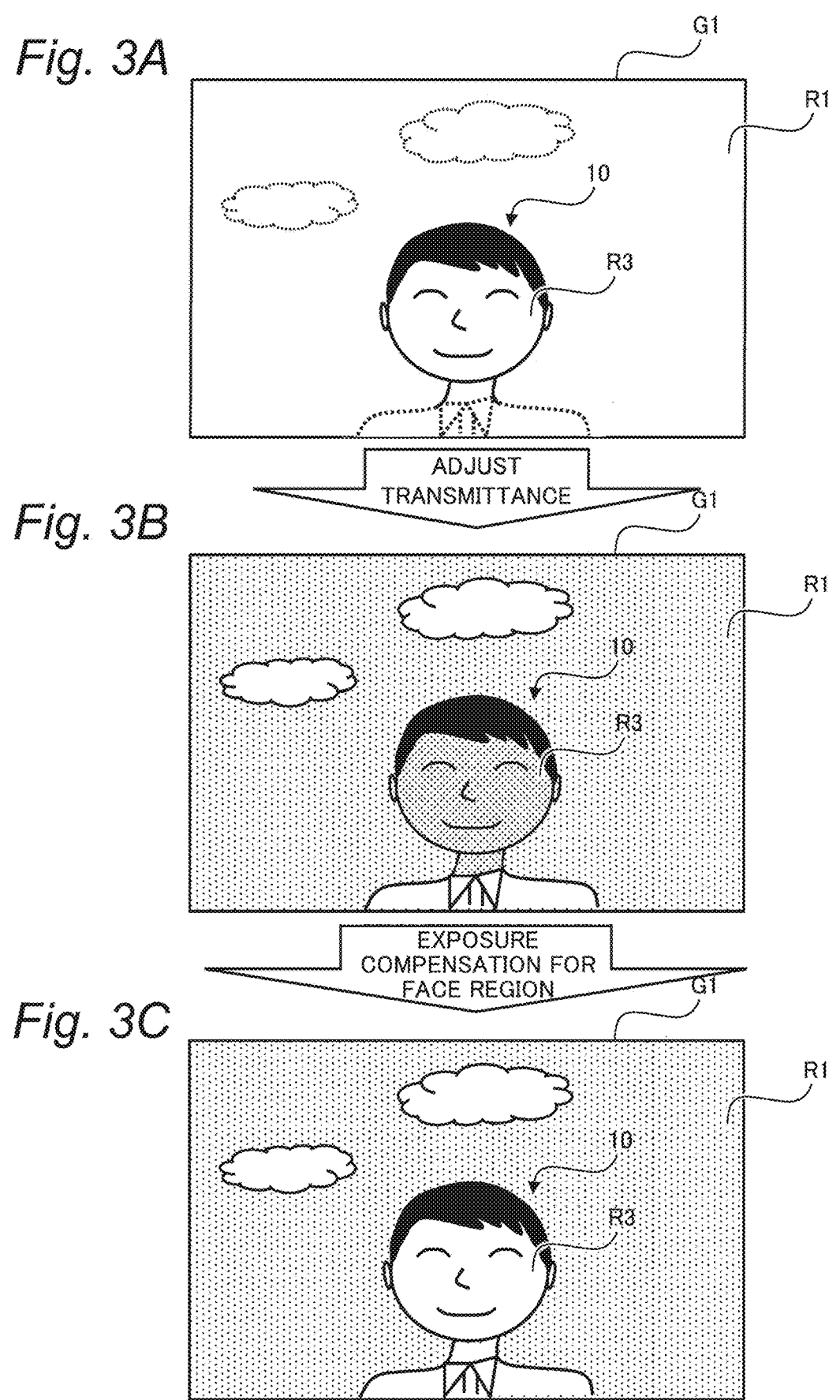
FIGS. 3A to 3C are diagrams for illustrating an overview of an operation of the digital camera according to the first embodiment.

FIGS. 3A to 3C are diagrams for illustrating the overview of the operation of the digital camera 100 according to the present embodiment.

FIG. 3A illustrates a through image G1 as an example of a photographing scene in which overexposure has occurred. The through image G1 illustrated in FIG. 3A includes a relatively bright region R1 (hereinafter referred to as "bright region R1") such as a background and a face region R3 corresponding to the face of a person 10, in a composition including the person 10 as a subject and the background such as a landscape.

As illustrated in FIGS. 3A to 3C, the face region R3 may include a part such as a neck in addition to a part corresponding to the face of the person 10. Such detection of the face region R3 can be achieved by, for example, machine learning in which training data is appropriately adjusted. In the example in FIGS. 3A to 3C, luminance in the face region R3 is lower than the luminance in the bright region R1, for example.

In the example in FIGS. 3A to 3C, the bright region R1 includes a region corresponding to a part such as the white clothes of the person 10 in addition to the background, for example. In the state in FIG. 3A, overexposure with excessive brightness occurs in the bright region R1, and appearance of the subject is unclear such as including blown-out highlights.

As a conventional countermeasure in such a photographing scene as described above, for example, exposure setting to lower the exposure value until the bright region R1 is not overexposed, or adjustment of the transmittance to lower the transmittance by the electronic ND filter 150 may be considered. FIG. 3B illustrates a through image G1 when adjustment is performed over the entire image to reduce the transmittance of the electronic ND filter 150 from the state in FIG. 3A. In this case, although the blown-out highlights of the bright region R1 can be eliminated from the state in FIG. 3A, as shown in FIG. 3B, the face region R3 becomes excessively dark, and underexposure with insufficient brightness occurs in the face region R3, which may lead to the unclear appearance of the subject, for example.

Therefore, the digital camera 100 of the present embodiment further detects the face region R3 in the through image G1 in which the transmittance of the electronic ND filter 150 is changed, and controls the electronic ND filter 150 to partially compensate the exposure based on the luminance in the detected face region R3, for example. FIG. 3C illustrates the through image G1 compensated by the exposure compensation for the face region R3 from the state in FIG. 3B.

For example, in the through image G1 shown in FIG. 3B, the digital camera 100 of the present embodiment selectively increases the transmittance of the part corresponding to the face region R3 in the electronic ND filter 150 and maintains the transmittance of the bright region R1. Accordingly, for example, as shown in FIGS. 3A to 3C, it is possible to also avoid underexposure of the face region R3 with eliminating overexposure of the bright region R1, and for example, it is possible to obtain a photographing result in which the face of the person 10 as a subject appears with appropriate brightness according to a color of the skin. As described above, for example, even in a photographing scene as shown in FIG. 3A, the digital camera according to the present embodiment suppresses excess or deficiency of exposure as the entire image including the face region R3, and enables photographing image clear as the entire image as shown in FIG. 3C.

Details of the operation of the digital camera 100 of the present embodiment that facilitates image shooting in which brightness is adjusted as an entire image as described above will be described below.

2-2. Overall Operation

The overall operation when capturing an image using the electronic ND filter 150 as described above, in the digital camera 100 according to the present embodiment, will be described with reference to FIG. 4.

Figure 4:
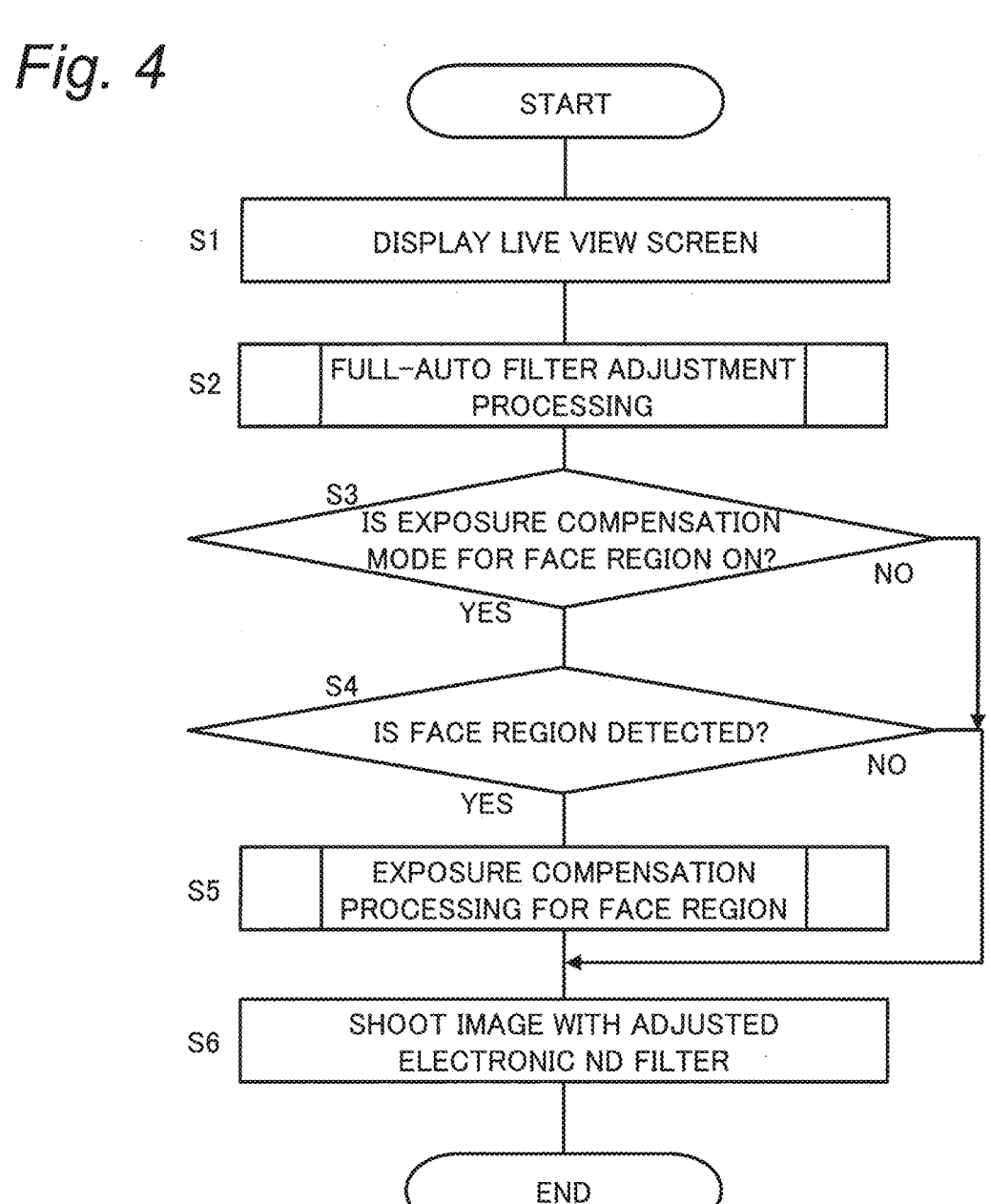
FIG. 4 is a flowchart for illustrating the overall operation of the digital camera in the first embodiment.

FIG. 4 is a flowchart for illustrating the overall operation of the digital camera 100 in the present embodiment. The processing of the present flowchart is started in a state where adjustment modes to adjust the electronic ND filter 150 are set in the digital camera 100, for example, and is executed by the controller 180. The adjustment modes are various operation modes in which the transmittance is automatically or manually adjusted in the image capturing using the electronic ND filter 150 described above. Hereinafter, an example will be described in which a full-auto mode is set as the adjustment mode. The full-auto mode is an adjustment mode in which the digital camera 100 automatically adjusts the electronic ND filter 150 according to a situation in image shooting while not according to any user operation.

First, the controller 180 causes the display monitor 220 to display a live view screen (S1). The live view screen is a screen that displays the through image G1 in real time. In step S1, the electronic ND filter 150 is in an initial state, and for example, the transmittance is set to an initial value such as 100% overall. For example, in the example in FIGS. 3A to 3C, the through image G1 shown in FIG. 3A is displayed on the live view screen in step S1.

For example, the controller 180 adjusts the transmittance of the electronic ND filter 150 according to the full-auto mode in the through image G1 with which the live view screen is displayed (S2). In such a full-auto filter adjustment processing (S2), the controller 180 automatically adjusts the transmittance of each pixel 51 of the electronic ND filter 150 according to brightness of each part in a photographing scene, for example. Details of the processing in step S2 will be described below.

The digital camera 100 according to the present embodiment has an exposure compensation mode for the face region as an operation mode executing exposure compensation for the face region R3 using face detection, for example. For example, before executing the processing of the present flowchart, the controller 180 causes the display monitor 220 to display a setting menu related to exposure compensation and receives, in the user I/F 210, a user operation selecting "ON" or "OFF" to enable or disable the exposure compensation mode. The controller 180 acquires setting information indicating the enablement or disablement according to such a user operation and holds the setting information in the buffer memory 170 or the like.

For example, after executing the adjustment processing in the full-auto mode (S2), the controller 180 determines whether the exposure compensation mode of the face region is "ON", that is, enabled, based on the setting information described above (S3).

When the exposure compensation mode for the face region is enabled (YES in S3), the controller 180 determines whether the face region R3 is detected based on the detection information by the face recognizer 162 (S4).

When the face region R3 is detected, the controller 180 performs processing to partially adjust brightness according to the luminance in the face region R3, as exposure compensation for the face region R3, in the through image G1 (S5). In such exposure compensation processing for the face region (S5), in the present embodiment, the controller 180 adjusts the transmittance of each pixel 51 of the electronic ND filter 150 according to the brightness of the detected face region R3, for example. Details of the processing in step S5 will be described below.

As described above, for example, in a state where the electronic ND filter 150 is adjusted by the full-auto filter adjustment processing (S2) and the exposure compensation processing for the face region (S5), the controller 180 executes the image shooting operation by the digital camera 100 (S6). For example, in still-image shooting, when detecting a user operation such as pressing a shutter button in the user I/F 210, the controller 180 causes the image sensor 140 to execute a still-image capturing operation, and records the generated image data in the memory card 200 via the card slot 190. In step S6, a plurality of still images may be shot, or continuous shooting may be performed. Further, step S6 is not limited to still image shooting, and may be moving image shooting.

When the exposure compensation mode for the face region is not "ON", that is disabled (NO in S3), the controller 180 proceeds to step S6 without executing the processing in step S5, for example. Similarly to this case, when the exposure compensation mode is enabled and the face region is not detected (YES in S3, NO in S4), the controller 180 also proceeds to step S6.

According to the overall operation described above, the digital camera 100 of the present embodiment automatically adjusts the transmittance of the electronic ND filter 150 (S2), and when the face region is detected (YES in S4), performs the exposure compensation processing for the face region (S5), and then performs image shooting (S6). Accordingly, it is possible to appropriately adjust the electronic ND filter 150 according to the subject in various photographing scenes and to facilitate image shooting with reducing excess or deficiency of exposure.

In the above, an example is described in which whether the exposure compensation mode for the face region is enabled is determined based on the preset setting information (S3). In step S3, for example, the controller 180 may cause the display monitor 220 to display a setting menu for the exposure compensation mode and may receive a user operation selecting the enablement or disablement using the user I/F 210. The determination in step S3 may be made according to not limited to the setting information set in advance, but according to such a user operation during execution of the present flowchart.

2-2-1. Full-Auto Filter Adjustment Processing

Details of the full-auto filter adjustment processing in step S2 in FIG. 4 will be described with reference to FIGS. 5A to 7.

Figure 5A:
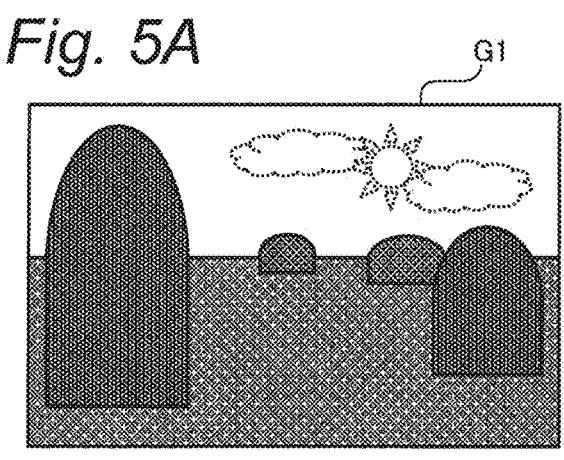
FIGS. 5A to 5F are diagrams for illustrating a full-auto mode in the digital camera.
Figure 5B:
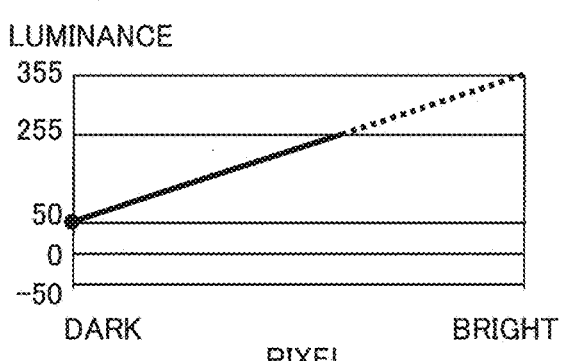

FIGS. 5A to 5F are diagrams for illustrating a full-auto mode in the digital camera 100 of the present embodiment. FIG. 5A illustrates a through image G1 before adjustment in the full-auto mode. FIG. 5B illustrates a correspondence relationship between luminance and pixels in the through image G1 in FIG. 5A. In FIG. 5B, the vertical axis represents luminance, and the horizontal axis corresponds to pixels. The left side in the figure corresponds to darker pixels, and the right side corresponds to brighter pixels (the same applies to FIGS. 5D and 5F).

FIGS. 5A and 5B illustrate a state in which the transmittance of the electronic ND filter 150 is set to the maximum value "100%" as the initial value. In the through image G1 in FIG. 5A, blown-out highlights occur due to the excessively bright background. Accordingly, in the graph in FIG. 5B, a state in which the luminance of the corresponding pixel potentially exceeds the upper limit value "255" is illustrated by a broken line.

Figure 5C:
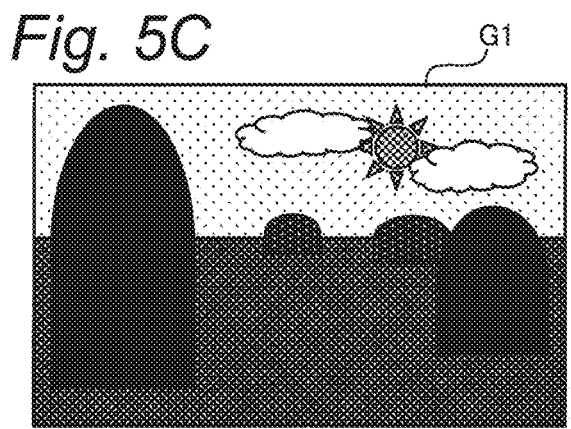
Figure 5D:
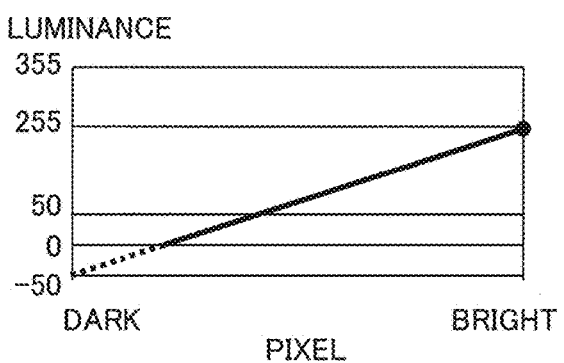

FIGS. 5C and 5D illustrate states in which the transmittance of the electronic ND filter 150 is reduced across the entire image from the states in FIGS. 5A and 5B. For example, in a conventional technique such as the exposure setting or an electronic ND filter with the uniform transmittance control across the entire screen, when adjustment is made to eliminate the blown-out highlights in the state in FIGS. 5A and 5B, underexposure occurs in a relatively dark region of the through image G1, and black crush occurs as in FIG. 5C. Accordingly, in the graph in FIG. 5D, a state in which the luminance of the corresponding pixel is potentially below the lower limit value "0" is illustrated by a broken line.

Figure 5E:
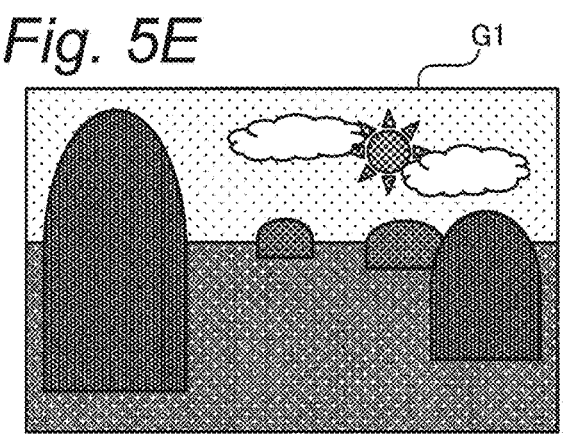
Figure 5F:
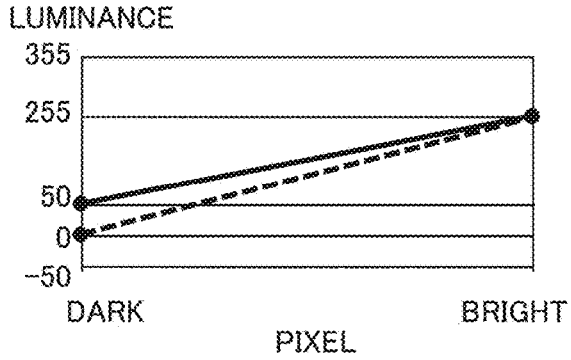

The blown-out highlights and black crush as described above are not limited to specific regions on the image and may be scattered in various positions. Therefore, the digital camera 100 of the present embodiment adjusts the transmittance of the electronic ND filter 150 according to the brightness of each pixel (i.e., the light amount on the incident surface 50) in order to automatically eliminate both blown-out highlights and black crush as described above in the full-auto mode. FIGS. 5E and 5F illustrate adjustment results of the full-auto mode with respect to the examples in FIGS. 5A to 5D.

In the examples in FIGS. 5E and 5F, the contrast between the brightest pixel and the darkest pixel is reduced by the full-auto filter adjustment processing (S2 in FIG. 4) in the digital camera 100 according to the present embodiment, and the blown-out highlights and black crush in FIGS. 5A to 5D can be eliminated. FIG. 6 is a flowchart illustrating full-auto filter adjustment processing (S2) in the digital camera 100.

First, for example, as shown in FIGS. 5A and 5B, in a state where the transmittance of the electronic ND filter 150 is the initial value (100%), the controller 180 detects the darkest pixel and its luminance on the through image G1 (S41).

Further, for example, in step S41, the controller 180 acquires the luminance value of each pixel in which blown-out highlights has not occurred in FIG. 5A and which is less than the upper limit value "255" in FIG. 5B, and manages the pixel and each luminance value in association with each other. Further, the controller 180 may specify a pixel with blown-out highlights for which the luminance is the upper limit value "255". Such pixel management may be performed collectively on a plurality of pixels corresponding to one pixel 51 of the electronic ND filter 150.

Next, for example, as shown in FIGS. 5C and 5D, the controller 180 reduces the transmittance of the electronic ND filter 150, and detects the transmittance at which the luminance of the brightest pixel becomes the upper limit value "255" (S42).

For example, in step S42, the controller 180 acquires the luminance value of each pixel in the state in FIG. 5D for the pixel group including each pixel with blown-out highlights in FIG. 5B, and adds the acquired luminance value to the managed correspondence relationship in step S41. Accordingly, for example, the correspondence relationship between each pixel and the luminance value over all the images can be managed up to the range of the broken line portion in addition to the solid line portion in FIG. 5B. The luminance value for each pixel 51 managed in this manner is caused by the amount of light incident on the incident surface 50 of the electronic ND filter 150.

Next, the controller 180 sets the transmittance of each pixel 51 of the electronic ND filter 150 in a distribution in which the transmittance is assigned in proportion to the magnitude of the luminance value, for example, based on the various types of information obtained in steps S41 and S42 (S43). The processing in step S43 will be described with reference to FIG. 7.

Figure 7:
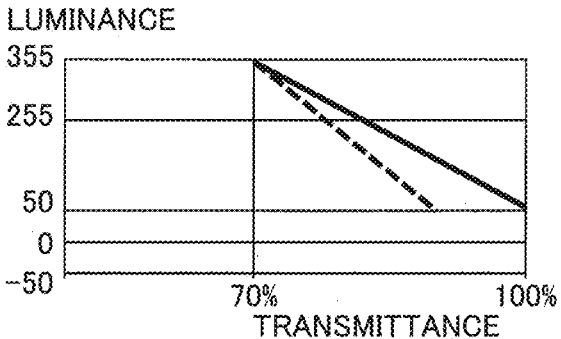
FIG. 7 is a diagram for illustrating the transmittance distribution of the electronic ND filter in the full-auto mode.

FIG. 7 is a diagram for illustrating the transmittance distribution of the electronic ND filter 150 in the full-auto mode. In FIG. 7, the vertical axis represents the luminance value of each pixel as in FIG. 5B, and the horizontal axis represents the transmittance of the electronic ND filter 150.

In step S43, for example, as shown in FIG. 7, the controller 180 calculates a correspondence relationship between each luminance value in a range from the luminance value "355" of the brightest pixel to the darkest pixel "50" and the transmittance. In the example in FIG. 7, the transmittance detected in step S42 is associated with the highest luminance value "355", and the transmittance is set to increase linearly with respect to a decrease in the corresponding luminance value. Further, in the setting indicated by the solid line in FIG. 7, the lowest luminance value "50" is associated with the maximum value "100%" of the transmittance.

Based on the correspondence relationship between the transmittance and the luminance values (FIG. 7) as described above and the correspondence relationship between the luminance values and the pixels (see FIG. 5B) managed in steps S41 to S42, the controller 180 assigns the transmittance corresponding to each luminance value in FIG. 7 to the pixels 51 corresponding to the luminance values (S43), for example.

By adjusting the transmittance of the electronic ND filter 150 as described above (S43), the controller 180 ends the filter adjustment processing (S2) in the full-auto mode and proceeds to step S3 in FIG. 4, for example.

According to the filter adjustment processing (S41 to S43) in the full-auto mode described above, the digital camera 100 can automatically adjust the transmittance of each pixel 51 of the electronic ND filter 150 in consideration of the amount of light incident on each pixel in the photographing scene from the luminance in the through image G1.

Accordingly, for example, in the example in FIG. 5B, the transmittance is set relatively low for the pixel exceeding the upper limit value "255" (FIG. 7), and as shown in FIG. 5F, the luminance of the pixel can be suppressed to the upper limit value or less to eliminate blown-out highlights (FIGS. 5A and 5E). Further, for example, in the example in FIG. 5D, the transmittance is set to be relatively high for a pixel falling below the lower limit value "0", and as shown in FIG. 5F, the luminance of the pixel can be set to the lower limit value or more, and the black crush can be avoided (FIGS. 5C and 5E).

In the above description, an example of the transmittance distribution in step S43 is described. The transmittance distribution in step S43 is not limited to the above example, and various distributions are possible. For example, as indicated by a broken line in FIG. 7, the transmittance corresponding to the lowest luminance value may be less than the maximum value. For example, as indicated by the broken line in FIG. 5F, the transmittance corresponding to the lowest luminance value may be set so as to reduce the luminance of the darkest pixel to the lower limit value "0". Further, for example, in the processing similar to step S41 in FIG. 6, such transmittance may be further detected. Accordingly, brightness adjustment using a wider dynamic range of the digital camera 100 can be realized.

2-2-2. Exposure Compensation Processing for Face Region

Details of the exposure compensation processing for the face region in step S5 in FIG. 4 will be described with reference to FIGS. 8 to 11.

Figure 8:
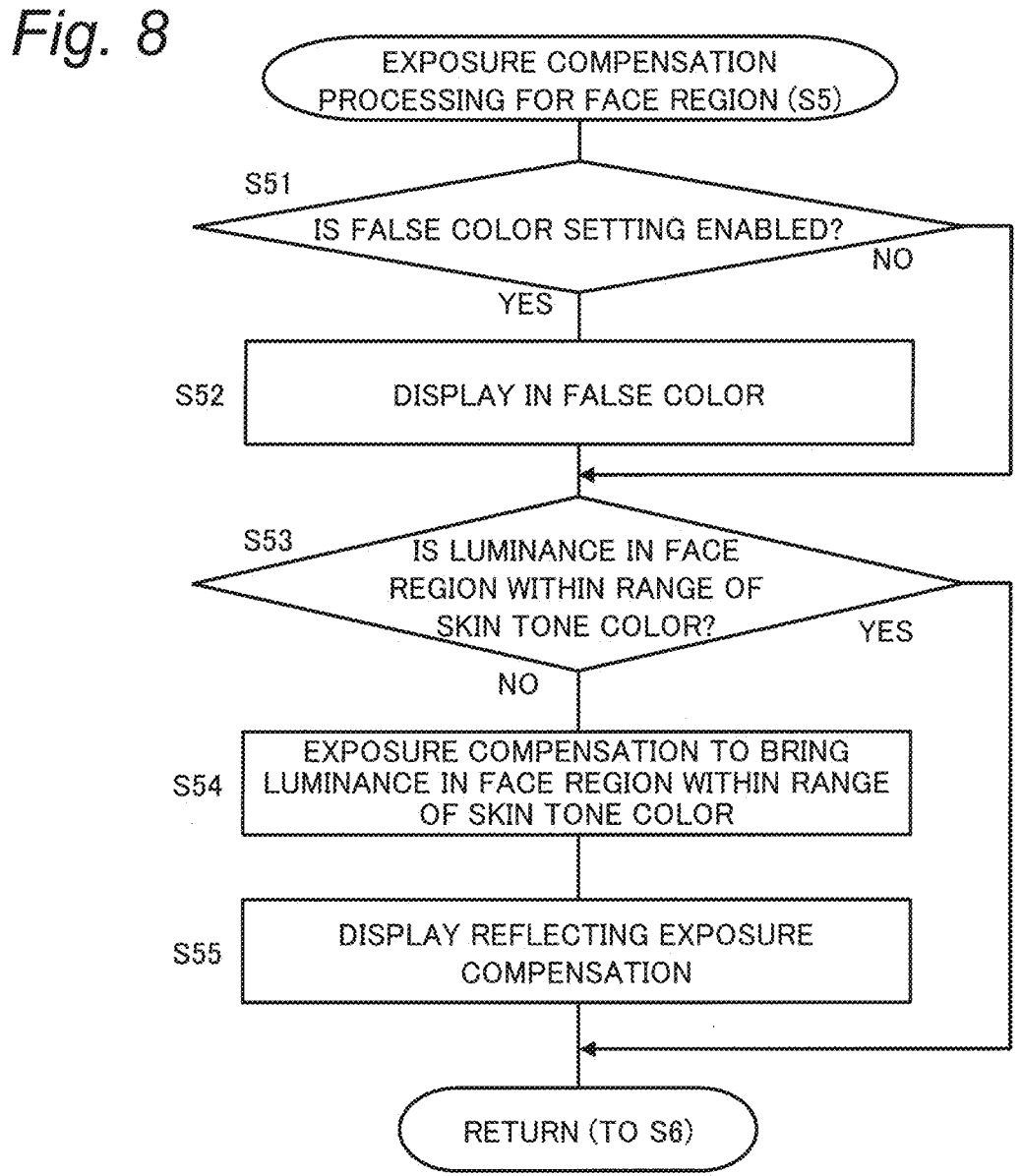
FIG. 8 is a flowchart illustrating exposure compensation processing for a face region in the digital camera.
Figures 9A, 9B, 9C:
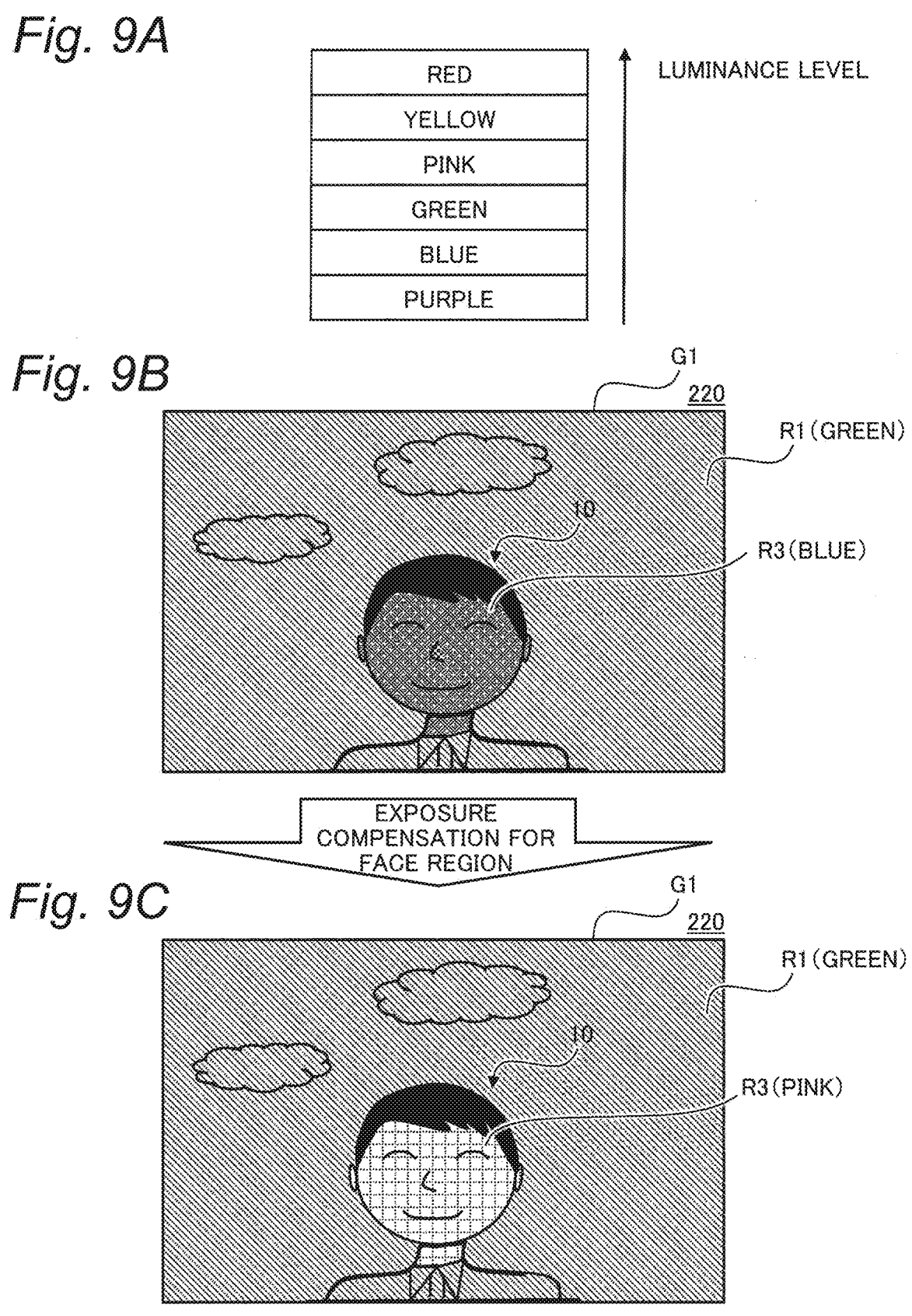
FIGS. 9A to 9C are diagrams for illustrating display examples in false color in the digital camera.

FIG. 8 is a flowchart illustrating exposure compensation processing for the face region (S5) in the digital camera 100. For example, on the live view screen, the digital camera 100 of the present embodiment has a function displaying the through image G1 in a false color according to luminance for each position. FIGS. 9A to 9C are diagrams for illustrating display examples in false color in the digital camera 100.

The false color is defined as color coding according to a luminance level, for example, as shown in FIG. 9A. For example, a predetermined IRE range corresponds to each color in units of IRE (Institute of Radio Engineers) indicating a luminance level. IRE is a value of "0" or more, and the closer IRE is to "100", the more overexposed an image is. Such a false color IRE range may be set in the digital camera 100 in advance, or may be designated by a user operation in the user I/F 210 using a predetermined menu screen or the like. For example, in the digital camera 100, the IRE range corresponding to a standard exposure adjusted by a function of auto exposure control (AE control) is set to be displayed in a green false color.

The display in false color is used to facilitate for the user to check appropriate exposure, in such a case where a person is photographed as a main subject, for example. For example, the IRE range corresponding to a luminance level one step higher than the standard exposure, in stepwise ranges for adjusting the exposure value, is set to the false color of pink, so as to indicate the exposure at which the face of the person is easily photographed with appropriate brightness according to the color of the skin. When a pixel in the through image G1 has a luminance level corresponding to brightness of the skin of the person, the pixel is displayed in the pink false color.

In the flowchart in FIG. 8, the controller 180 determines whether the setting of performing display in false color as described above is enabled (S51). The setting may be performed in advance or may be performed in step S51, according to a user operation using a setting menu from which the enablement or disablement of the false color display can be selected.

When the false color setting is enabled (YES in S51), the controller 180 causes the live view screen to display the through image G1 in false color (S52). FIG. 9B shows a display example in the false color of the through image G1 illustrated in FIG. 3B. The controller 180 converts, for example, the luminance of each pixel into a false color in the through image G1. In the example in FIG. 9B, the bright region R1 is displayed in green, and the face region R3 is displayed in blue. Accordingly, for example, it is possible to display in easily understandable manner for the user. that blown-out highlights or black crush does not occur in the bright region R1, while the face region R3 is darker than the luminance level corresponding to the brightness of the skin of the person as described above.

After the through image G1 is displayed by false color (S52), for example, the controller 180 determines whether the luminance in the face region R3 detected in the through image G1 in step S4 in FIG. 4 is within a range of a skin tone color (S53). The range of the skin tone color is set as a predetermined range of luminance according to brightness of the skin of the person, and is stored in advance in the flash memory 240 or the like. The range may be set as, for example, the IRE range corresponding to false color pink. When the false color setting is not enabled (NO in S51), the controller 180 proceeds to the determination in step S53 without performing the processing in step S52.

Figure 10:
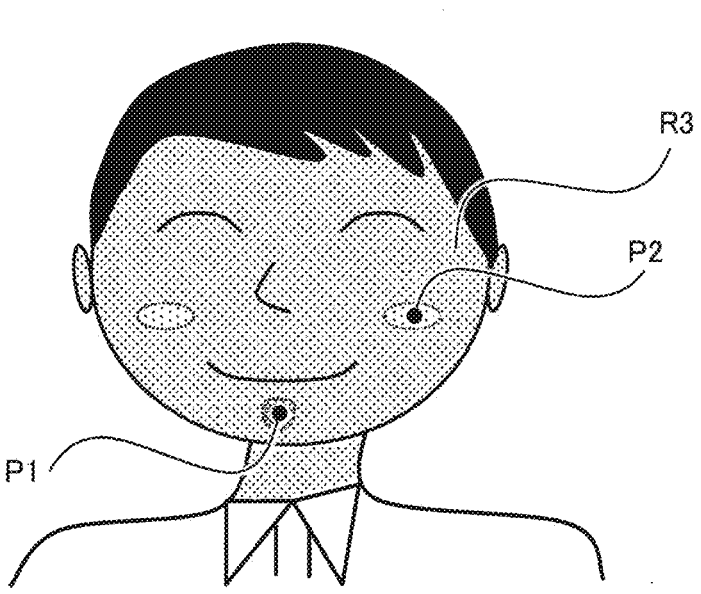
FIG. 10 is a diagram for illustrating exposure compensation processing for the face region.
Figure 11:
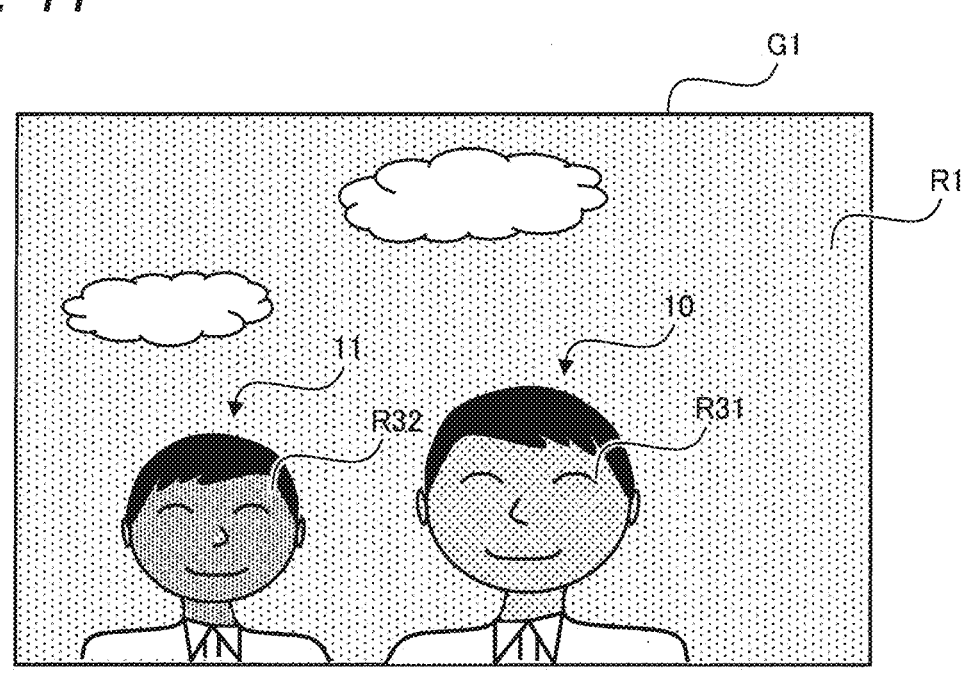
FIG. 11 is a diagram for illustrating an example in which the exposure compensation processing for the face region is performed on a plurality of subjects.

When the luminance in the face region R3 is not within the range of the skin tone color (NO in S53), the controller 180 compensates the exposure for the face region R3 in the through image G1 to adjust the luminance in the face region R3 to be within the range (S54). In the present embodiment, the controller 180 realizes such exposure compensation by partially adjusting the transmittance of the face region R3 in a state after setting the transmittance of the electronic ND filter 150 (S43) by the full-auto filter adjustment processing (S2). FIG. 10 is a diagram for illustrating exposure compensation processing (S5) of the face region.

In step S54, the controller 180 detects, for example, the darkest pixel P1 and its luminance, and the brightest pixel P2 and its luminance on the face region R3. In such detection, luminance of respective pixels may be compared without including a region corresponding to a part where the luminance is expected to be out of the range of the skin tone color, such as an eye part, in the face region R3. A known technique such as in Non-Patent Document 1 can be used to detect a facial part such as an eye, for example.

After detecting the darkest pixel P1, the brightest pixel P2, and the luminance of each pixel, the controller 180 increases or decreases the transmittance of the electronic ND filter 150 to detect the transmittance at which each luminance falls within the range of the skin tone color. For example, the detection is made to detect the transmittance at which the luminance of the darkest pixel P1 is the lower limit value of the range and the luminance of the brightest pixel P2 is the upper limit value of the range.

For example, similarly to the full-auto filter adjustment processing (S2), the controller 180 manages each pixel and a luminance value of the corresponding pixel in the face region R3 in association with each other. With such a correspondence relationship, the controller 180 changes the transmittance of each pixel 51 in a part corresponding to the face region R3 on the electronic ND filter 150 by a compensation amount to be increased or decreased from the set transmittance, so that the compensation amount is assigned according to the magnitude of the luminance value for each pixel. For example, the controller 180 calculates the compensation amount of the transmittance so that the transmittance of each pixel 51 after the change becomes proportional to the magnitude of the luminance value of each pixel in the face region R3.

In the above processing, for example, the transmittance may be changed by assigning the compensation amount also to pixels 51 in regions corresponding to eyes or the like. As described above, for example, from the transmittance set by the full-auto filter adjustment processing (S2), as the transmittance after the exposure compensation for the face region R3, new transmittance is set for each pixel 51 of the electronic ND filter 150 according to brightness in the face region R3.

The controller 180 causes the display monitor 220 to display a through image G1 based on an imaging result of the image sensor 140 in a state where the setting of the transmittance is reflected, for example (S55). The controller 180 controls the electronic ND filter 150 so as to set the transmittance detected in step S54 to a region corresponding to the face region R3, and acquires the through image G1 reflecting exposure compensation for the face region R3 as shown in FIG. 3C, for example, as the imaging result.

When the setting of the false color display is enabled (YES in S51), the controller 180 may display the obtained through image G1 in the false color, for example, as shown in FIG. 9C. In the example in FIG. 9C, the face region R3 is displayed in the false color of pink corresponding to the luminance range of the skin tone color. In this case, as described above, the controller 180 causes the display monitor 220 to display the through image G1 converted into the false color so as to highlight a region having luminance included in the range of the skin tone color in the through image G1.

For example, after the through image G1 reflecting the exposure compensation for the face region R3 is displayed (S55), the controller 180 ends the exposure compensation processing for the face region (S5) with the current state of the electronic ND filter 150 as a compensation result and proceeds to step S6 in FIG. 4. When the luminance in the detected face region R3 is within the range of the skin tone color (YES in S53), the controller 180 proceeds to step S6 without performing the processing in subsequent steps S54 and S55.

According to the exposure compensation processing for the face region (S5) described above, the transmittance of the electronic ND filter 150 set in the full-auto adjustment processing (S2), for example, is partially changed so that the luminance in the face region R3 is adjusted to be within the range of the skin tone color (S53, S54). As described above, the exposure for the face region R3 can be compensated so that the luminance in the face region R3 falls within the range of the skin tone color corresponding to the brightness of the skin.

In the above description, an example is described in which the darkest pixel P1, the brightest pixel P2, and the like are detected on the face region R3 without including a specific part such as the eye in step S54, but the detection may be performed including such a part. Further, in the above description, an example is described in which the transmittance distribution is set assigning the transmittance to a region including the part such as the eye, but the transmittance may be assigned without including such the specific part.

In the above description, an example is described in which the region where the luminance is in the range of the skin tone color in the through image G1 is highlighted by the false color (S51, S52). Such highlighting is not limited to the false color and may be performed by a zebra pattern, for example, similarly to what is called a zebra display function. For example, the controller 180 may highlight a region having a predetermined luminance level corresponding to the range of the skin tone color with the zebra pattern.

Although an example in which the exposure compensation processing for the face region (S5) is performed on the face region R3 of one subject such as the person 10 is described above, the processing is also applicable to face regions of a plurality of subjects. An example in which the exposure compensation processing for the face region (S5) is performed on a plurality of subjects will be described with reference to FIG. 11. In the example in FIG. 11, in the through image G1, for example, a face region R32 of a person 11 is detected in addition to a face region R31 of the person 10 similar to the face region R3 in FIG. 3B. In the through image G1 illustrated in FIG. 11, the face regions R31 and R32 appear with different brightness.

For example, when the face region R31 of the person 11 is detected as a main subject such as a target of autofocus control (AF control) or AE control in the digital camera 100, only the exposure of the face region R31 may be compensated. Further, the brightest luminance and the darkest luminance may be detected in each of the face regions R31 and R32, and the exposure of each of the face regions R31 and R32 may be compensated so that an average value, or a maximum value and a minimum value for the face regions R31 and R32 fall within the range of the skin tone color. Further, the processing in step S54 may be performed for each of the face regions R31 and R32 individually in the same manner as described above.

3. Summary

As described above, the digital camera 100 as an example of the imaging apparatus according to the present embodiment includes the image sensor 140, the electronic ND filter 150 as an example of the adjuster, the face recognizer 162 as an example of the detector, and the controller 180. The image sensor 140 captures a subject image by receiving incident light to generate image data. The electronic ND filter 150 adjusts the transmittance as an example of a light reception rate in each position on the incident surface 50, the light reception rate allowing the image sensor 140 to receive the light, the incident surface 50 being entered by the light and corresponding to the image indicated by the image data. The face recognizer 162 detects the face region R3 as an example of a skin region in the through image G1 as an example of the image, the skin region corresponding to a part with skin of a subject indicated by the subject image. The controller 180 controls the electronic ND filter 150 to render the light reception rate in a position corresponding to a part of the through image G1 different from the light reception rate in another position, on the incident surface 50 (S5). The controller 180 compensates the exposure of a part corresponding to the face region R3 detected by face recognizer 162 to bring luminance in the face region R3 within, as an example of a predetermined range, the range of the skin tone color corresponding to brightness of the skin (S5).

According to the digital camera 100 described above, in the through image G1, the exposure of the part corresponding to the face region R3 is compensated so that the luminance in the face region R3 of the subject falls within the range of the skin tone color (S5). Accordingly, brightness can be adjusted according to the subject in the image to be captured.

In the present embodiment, the controller 180 detects whether the luminance in the detected face region R3 is within the range of the skin tone color (S53), and when detecting that the luminance is not within the range of the skin tone color (NO in S53), compensates the exposure of the part corresponding to the face region R3 (S54). Accordingly, the exposure is compensated for the face region R3 in which the luminance is detected as not being within the range of the skin tone color, and for example, brightness can be adjusted in the image to be captured so as to have appropriate exposure corresponding to brightness of the skin.

In the present embodiment, the controller 180 controls the electronic ND filter 150, according to an amount of light incident in each position on the incident surface 50, to reduce the light reception rate with increasing amount of light in each position (S43), and compensates the exposure of the part corresponding to the face region R3 in the image in which the light reception rate is adjusted (S54). Therefore, it is possible to further compensate the exposure for the face region R3 and adjust the brightness according to the subject in a state where the transmittance is automatically set according to brightness of each part in various photographing situations.

In the present embodiment, the electronic ND filter 150 adjusts the transmittance of the incident light as the light reception rate for each position on the incident surface 50 corresponding to each pixel in an image such as the through image G1. By using the electronic ND filter 150 capable of controlling the transmittance in units of pixels in this manner, the brightness can be easily adjusted according to the subject.

In the present embodiment, the controller 180 controls the electronic ND filter 150 to adjust the light reception rate in a position corresponding to the detected face region R3 on the incident surface 50, thereby compensates the exposure of the part corresponding to the face region R3 (S54). Therefore, the exposure compensation processing for the face region (S5) is performed using the electronic ND filter 150, and an imaging result in which the brightness is adjusted according to the subject in the compensated state can be obtained.

In the present embodiment, the digital camera 100 further includes a display monitor 220 as an example of a display that displays an image such as the through image G1. The controller 180 controls the display monitor 220 to highlight a region having luminance within the range of the skin tone color in the through image G1, for example, in a false color or a zebra pattern, according to luminance in each position in the through image G1 (S52). Therefore, it is possible for the user to easily check whether the subject is imaged at appropriate exposure.

In the digital camera 100 of the present embodiment, the adjuster includes the electronic ND filter 150 that adjusts the transmittance of the incident light as the light reception rate in each position on the incident surface 50. Therefore, it is possible to easily perform brightness adjustment in image capturing using the electronic ND filter 150 for regional control.

Second Embodiment

Hereinafter, a second embodiment of the present disclosure will be described with reference to FIGS. 12 and 13. In the first embodiment, the digital camera 100 is described in which the transmittance of the electronic ND filter 150 is adjusted over the entire image (S2), for example, and then the processing to partially compensate the exposure for the detected face region R3 (S5) is performed. In the second embodiment, a digital camera 100 that further compensates the exposure for the face region R3 so as to suppress and/or emphasize a region that becomes a shadow in the detected face region R3 will be described.

Hereinafter, a description of the similar configuration and operation to those of the digital camera 100 according to the first embodiment will be appropriately omitted, and the digital camera 100 according to the present embodiment will be described.

Figure 12:
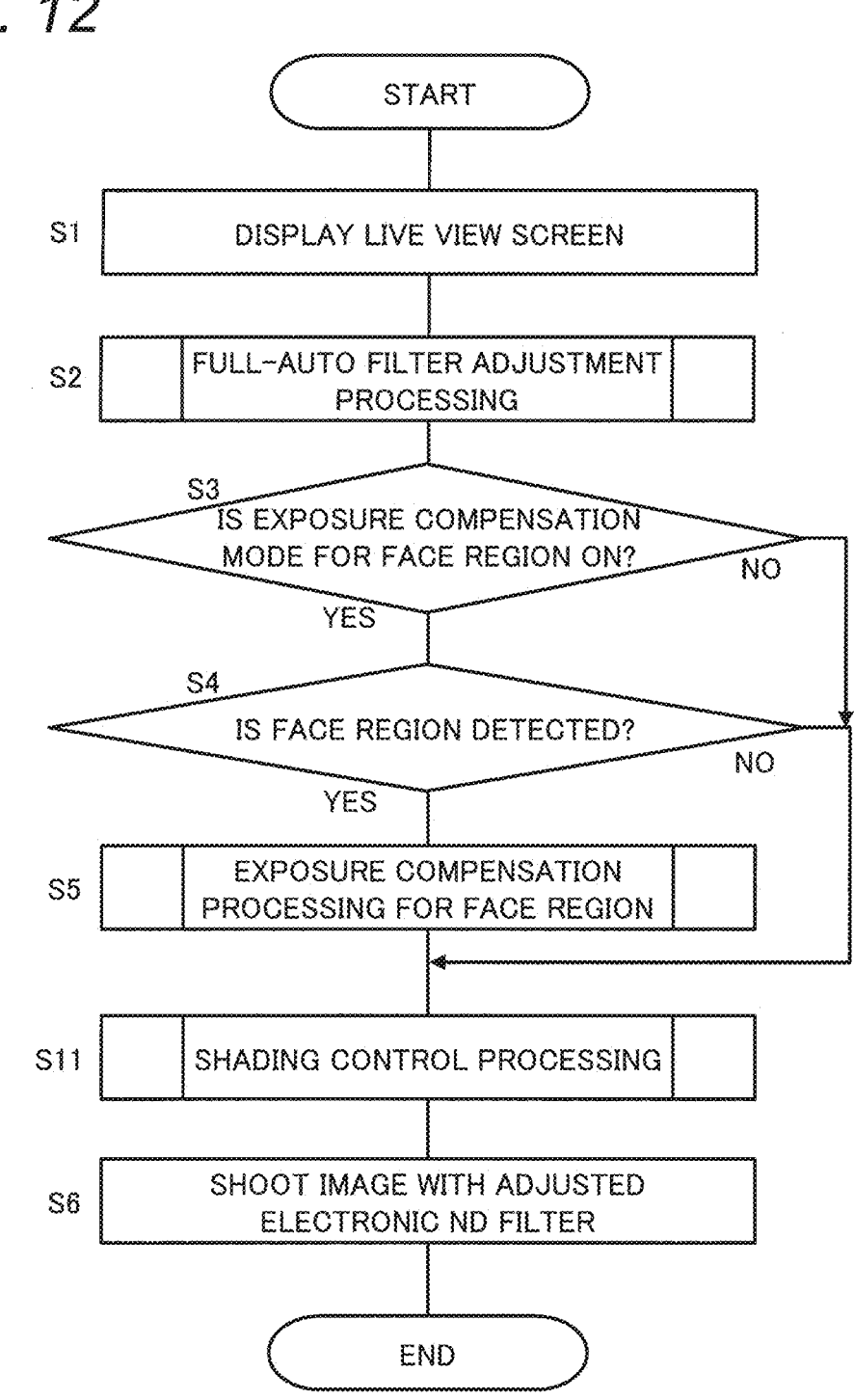
FIG. 12 is a flowchart for illustrating the overall operation of the digital camera in a second embodiment.

FIG. 12 is a flowchart for illustrating the overall operation of the digital camera 100 in the second embodiment. The digital camera 100 of the present embodiment further performs shading control processing to control brightness of a shadow part in the detected face region R3 (S11) in addition to processing similar to the overall operation of the first embodiment (S1 to S6), for example.

Figure 13:
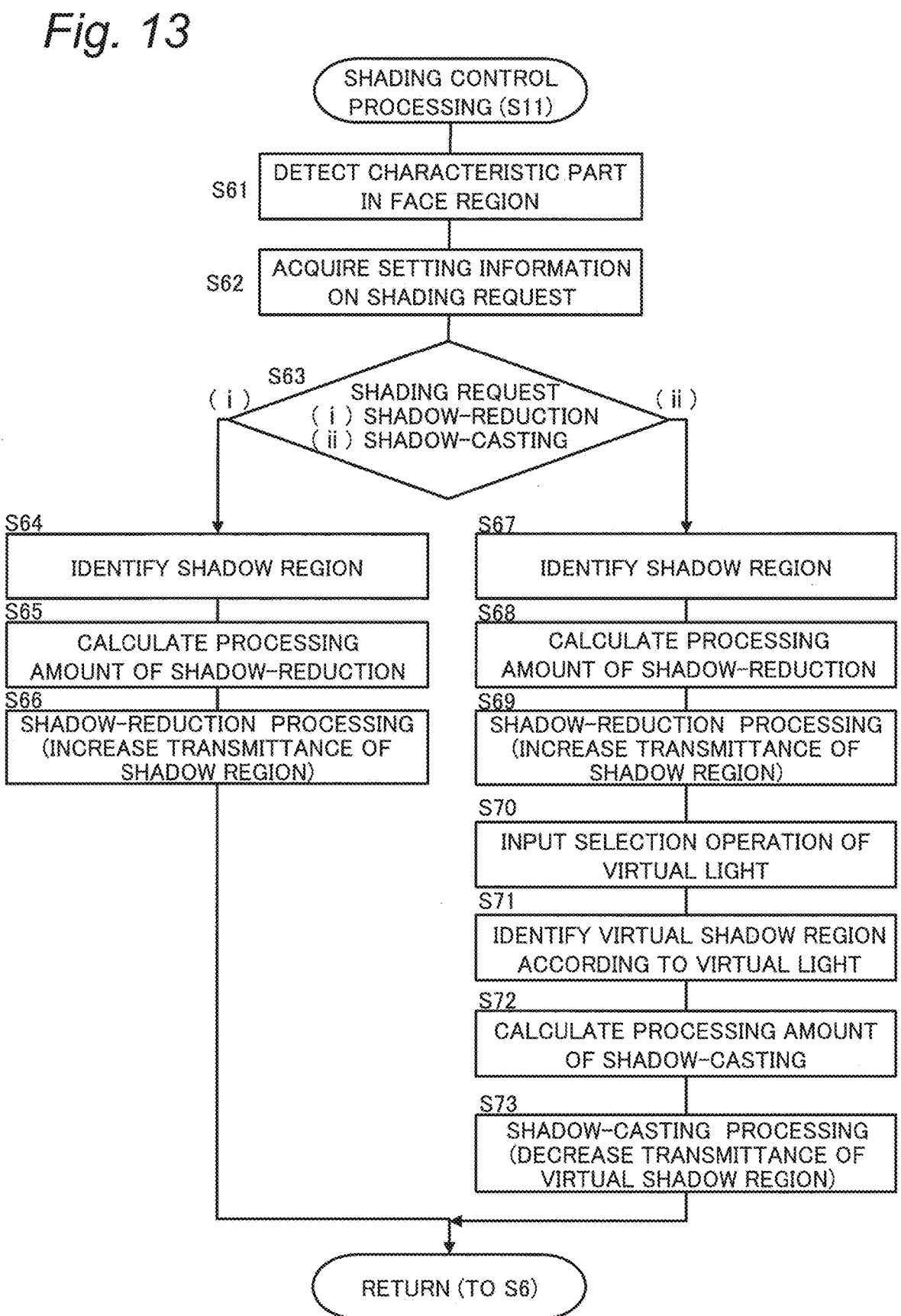
FIG. 13 is a flowchart illustrating shading control processing in the digital camera of the second embodiment.

FIG. 13 is a flowchart illustrating shading control processing (S11) in the digital camera 100 of the present embodiment. The processing of the present flowchart is started in a state where the exposure of the face region R3 is compensated in step S5 in FIG. 12.

In the face region R3, the controller 180 detects a characteristic part such as an eye, a nose, and a mouth of the person 10 (S61). The digital camera 100 of the present embodiment includes, for example, a range finder, and measures a distance to each part of the subject appearing in the through image G1 to generate shape information indicating a three-dimensional shape of the face of the subject. In step S61, the controller 180 detects the characteristic part based on the shape information on the face of the person 10 and color information in the HSV system or the like in the face region R3 by, for example, the known technique of Non-Patent Document 1. The shape information may be acquired by an image plane phase difference technology, a ToF sensor, or the like, without being limited to the rangefinder.

For example, in a state where a setting menu related to the shading control processing is displayed on the display monitor 220, the controller 180 receives a user operation using the setting menu via the user I/F 210. The controller 180 acquires setting information indicating a shading request set by such a user operation (S62). The shading request is set, for example, according to a user operation selecting one of shadow-reduction processing to brighten the shadow in the face region R3 and shadow-casting processing to darken the shadow. The user operation may be performed in advance, and in this case, the controller 180 may acquire the setting information held in the buffer memory 170 or the like.

The controller 180 determines whether the set shading request is (i) the shadow-reduction processing or (ii) the shadow-casting processing, based on the setting information acquired as described above (S63). When any of the processing is not set, that is, when there is no shading request, the process may proceed to step S6 in FIG. 12.

When the set shading request is the shadow-reduction processing ((i) in S63), the controller 180 identifies a shadow region indicating a part in shadow in the face region R3 (S64). For example, the controller 180 compares the luminance of each pixel in a region other than a region of the detected specific part in the face region R3, and identifies, as the shadow region, a portion where the luminance is lower than a surrounding portion by a predetermined level or more. The shadow region may be identified based on the color information as described above or may be identified as a portion having a color darker than the surrounding by a predetermined level or more in the face region R3 other than the specific part.

Based on the luminance in the face region R3, the controller 180 calculates, for example, an amount to increase the transmittance of the electronic ND filter 150 for the identified shadow region, as a processing amount of shadow-reduction (S65). For example, the processing amount of shadow-reduction may be calculated according to a predetermined amount or an amount of change at a predetermined rate that maintains continuity of the luminance between the shadow region and a region of the surrounding part in the face region R3 even when the shadow-reduction processing is applied, and may be calculated so as to gradually change between the regions.

The controller 180 increases the transmittance of the electronic ND filter 150 for the shadow region based on the calculated processing amount of shadow-reduction to perform the shadow-reduction processing (S66). By such shadow-reduction processing, the exposure of the face region R3 is further compensated so as to suppress the shadow in the face region R3.

When the set shading request is the shadow-casting processing ((ii) in S63), the controller 180 first performs processing similar to, for example, the above-described steps S64 to S66 (S67 to S69).

For example, in a state where virtual lights indicating virtual light sources are displayed at a plurality of positions such as four corners of the rectangular live view screen on the display monitor 220, the controller 180 receives a user operation selecting any one of virtual lights in the user I/F 210 (S70). The virtual light is arranged to emit light toward the center direction of the image, for example.

According to the selected virtual light, the controller 180 identifies, in the face region R3, a virtual shadow region indicating a part in shadow caused by the light from the virtual light (S71). In step S71, the controller 180 calculates the height or the like of the nose detected as the characteristic part from the shape information of the face region R3 acquired in step S61, for example, and performs calculation to identify such a virtual shadow region based on the calculated height of the characteristic part and the direction of light by the virtual light. For the above calculation, calculations in various types of shading processing or the like may be used.

Based on the luminance in the face region R3, the controller 180 calculates, for example, an amount for reducing the transmittance of the electronic ND filter 150 for the identified virtual shadow region, as a processing amount of shadow-casting (S72). The processing amount of shadow-casting is calculated as a predetermined value or an amount of change at a predetermined rate similar to the processing amount of shadow-reduction, for example, so as to maintain continuity of luminance between the shadow region and the surrounding region in the face region R3 even when the shadow-casting processing is applied.

The controller 180 performs shadow-casting processing by reducing the transmittance of the electronic ND filter 150 for the shadow region based on the calculated processing amount of shadow-casting (S73). By such shadow-casting processing, the exposure of the face region R3 is further compensated so as to emphasize the shadow in the face region R3.

After executing the shadow-reduction processing or the shadow-casting processing (S66, S73), the controller 180 ends the processing of the present flowchart and proceeds to step S6 in FIG. 12, managing the changed current state of the electronic ND filter 150 as a result of the shading control processing.

According to the shading control processing (S11) described above, in response to the shading request by the user operation (S63), the transmittance of the electronic ND filter 150 is partially changed as the shadow-reduction processing or the shadow-casting processing in the face region R3 (S66, S73). Accordingly, the exposure of the face region R3 can be further compensated so as to suppress or emphasize the shadow in the face region R3.

Although an example in which the shading control processing (S11) is performed using the electronic ND filter 150 is described above, the processing may be realized by image processing such as partially changing the luminance in the face region R3, for example. In this case, for example, a reduction amount of the luminance is calculated as the processing amount of shadow-reduction (S65, S68), and processing to reduce the luminance is executed in the shadow-reduction processing (S66, S69). Further, in this case, an increase amount of the luminance is calculated as the processing amount of shadow-casting (S72), and processing to increase the luminance is executed in the shadow-casting processing (S73). Further, the shading control processing may be implemented by, for example, a technique for changing lighting of an image using deep learning as disclosed in Non-Patent Document 2.

Although an example in which the shadow-casting processing is performed on the virtual shadow region according to the virtual light is described above (S70 to S73), for example, the processing to emphasize the shadow may be performed on the shadow region identified similarly to step S67 in the face region R3. Such processing can be used, for example, for a photographing scene of an image in which a person of a subject appears in a sculptured face.

Although an example of identifying the virtual shadow region using the virtual light is described above (S70, S71), for example, the light source may be estimated by image recognition or the like in the through image G1, and the shadow-casting processing may be performed according to the estimated light source.

Other Embodiments

As described above, the first and second embodiments are described as examples of the technique disclosed in the present application. However, the technique in the present disclosure is not limited thereto, and is also applicable to embodiments obtained by appropriately performing changes, substitutions, additions, omissions, and the like. In addition, it is also possible to combine each component described in the above embodiment to form a new embodiment.

In each of the above embodiments, an example is described in which the transmittance of each pixel 51 of the electronic ND filter 150 is set in the distribution in which the transmittance is assigned in proportion to the magnitude of the luminance value for each pixel of the through image G1 (S43) in the full-auto filter adjustment processing (S2). In the present embodiment, in the through image G1, for example, a setting for adjusting the transmittance may be performed only for a pixel having luminance equal to or lower than a predetermined level at which black crush occurs and a pixel having luminance equal to or higher than a predetermined level at which blown-out highlights occurs.

In each of the above embodiments, an example is described in which the digital camera 100 performs the full-auto filter adjustment processing (S2) and then compensates the exposure for the part corresponding to the face region. A modification in which the digital camera 100 of the present embodiment performs partial exposure compensation without performing the full-auto filter adjustment processing (S2) will be described with reference to FIG. 14.

Figure 14:
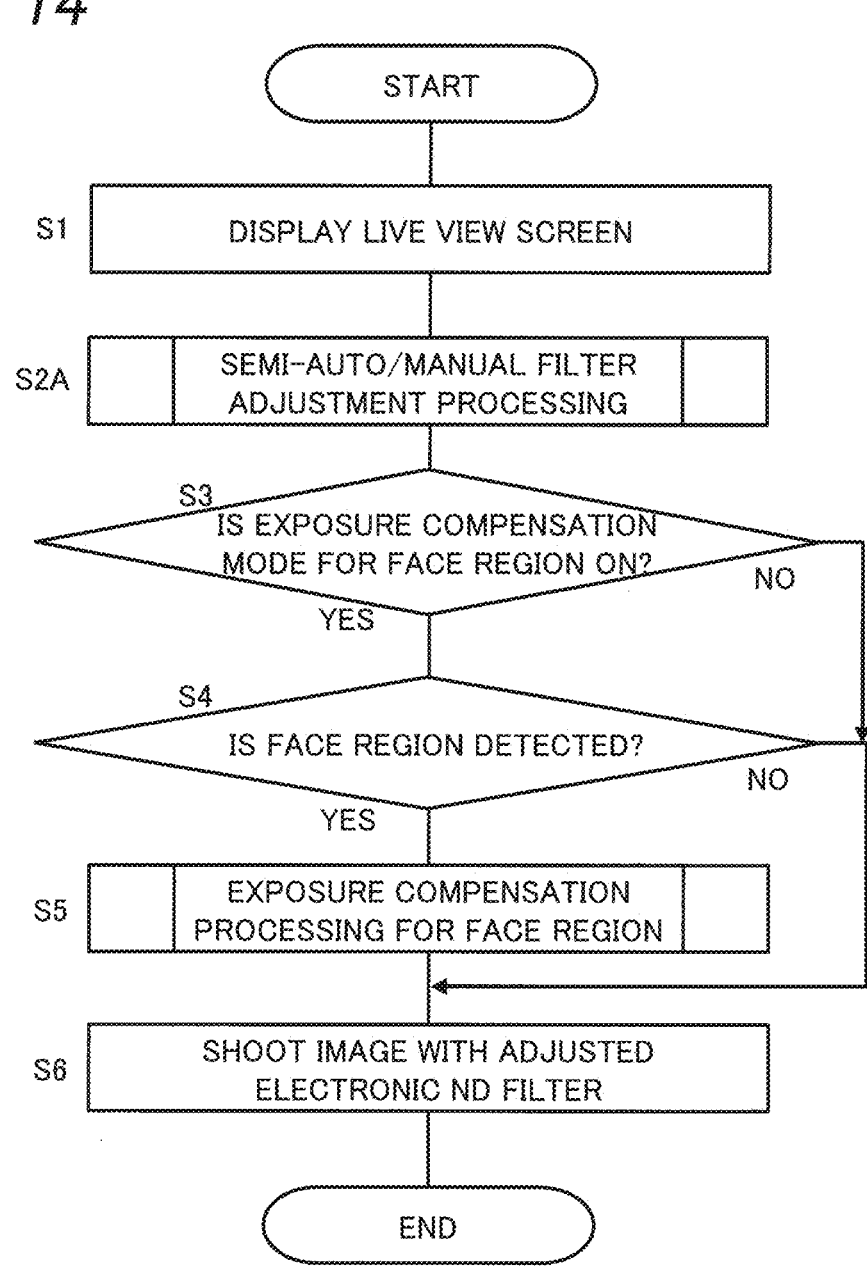
FIG. 14 is a flowchart for illustrating the operation of the digital camera in a modification of the first embodiment.

FIG. 14 is a flowchart for illustrating the operation of the digital camera 100 in the modification of the first embodiment. In the present embodiment, the adjustment mode of the electronic ND filter 150 may be set to, for example, a semi-auto mode or a manual mode, not limited to the full-auto mode. The semi-auto mode is an adjustment mode in which a partial region as a target of transmittance adjustment is detected by image recognition or the like in the through image G1, and fine adjustment by the user is prompted for the detection result. The manual mode is an adjustment mode for designating a partial region to be adjusted in accordance with a user operation.

The digital camera 100 of the present modification adjusts the transmittance of the electronic ND filter 150 according to the semi-auto mode or manual mode set (S2A), as shown in FIG. 14, instead of the full-auto filter adjustment processing (S2 in FIG. 4), for example. In such semi-auto/manual filter adjustment processing (S2A), the controller 180 adjusts the transmittance of the electronic ND filter 150 according to the user operation in the user I/F 210 for a detected or designated partial region (e.g., the bright region R1 shown in FIG. 3A) in which the exposure is excessive or deficient on the through image G1.

For example, in the semi-auto mode, the controller 180 may detect, as the partial region, a region where the luminance in the through image G1 is at a predetermined level. In the digital camera 100 of the present modification, the controller 180 performs the exposure compensation processing for the face region in the through image G1 in which the transmittance is adjusted as described above (S5). In step S5 of the present modification, for example, when the transmittance is set to the part corresponding to the face region R3 in step S2A described above, the controller 180 changes the set transmittance similarly to the processing in step S5 of the first embodiment. On the other hand, when the transmittance is not set to the part corresponding to the face region R3 in step S2A described above, the controller 180 sets the transmittance according to the luminance in the face region R3 from the initial state, for example.

As described above, after performing the semi-auto/manual filter adjustment processing (S2A), the digital camera 100 of the present modification compensates the exposure of the part corresponding to the face region R3 according to brightness of the face region R3 in the through image G1 (S5). Further, in the present modification, for example, similarly to the digital camera 100 of the second embodiment, after the exposure compensation processing for the face region (S5) is executed, the shading control processing (S11) may be performed.

As described above, in the present modification, the digital camera 100 further includes the user I/F 210 capable of inputting user operation. On the incident surface 50 of the electronic ND filter 150, the controller 180 controls the electronic ND filter 150 to adjust the light reception rate in a position corresponding to a partial region having excessive or deficient exposure in the through image G1 (an example of the image indicated by the image data generated by the image sensor 140) according to a user operation input to the user I/F 210, and compensates exposure of the part corresponding to the face region R3 (an example of the skin region) in the through image G1 in which the light reception rate is adjusted (S5). Also in this case, similarly to each of the above embodiments, it is possible to adjust brightness in the through image G1, which is as an example of the captured image, according to the subject.

In each of the above embodiments, an example is described in which the exposure compensation processing for the face region (S5) is performed using the electronic ND filter 150. Instead of changing the transmittance of the electronic ND filter 150, the digital camera 100 of the present embodiment may perform the exposure compensation processing for the face region by partially changing the luminance in the detected face region R3 by, for example, image processing on the through image G1. In the present embodiment, for example, instead of step S54 in FIG. 8, the controller 180 may execute processing to adjust the luminance so that the luminance in the face region R3 falls within the range of the skin tone color. In the present embodiment, the electronic ND filter 150 may not be adjustable in units of pixels, and for example, the transmittance may be adjustable in units of rows or columns.

In each of the above embodiments, the face recognizer 162 that detects the face region as an example of the skin region is described as an example of the detector, but the detector of the present embodiment is not limited to the face recognizer 162. For example, the detector of the present embodiment may be configured to detect the skin region without being limited to the face region. Such a detector may be implemented using, for example, a trained model obtained by machine learning for distinguishing a region corresponding to the skin from other regions in the image, or various image recognition techniques.

In each of the above embodiments, the electronic ND filter 150 is described as an example of the adjuster, but the adjuster of the present embodiment is not limited to the electronic ND filter 150. For example, the adjuster in the present embodiment may be configured to adjust sensitivity such as quantum efficiency of photoelectric conversion in each pixel in the image sensor 140 as the light reception rate. As such an adjuster, for example, a known technique such as JP 2019-068402 A can be applied. In this case, the incident surface of the adjuster may match to the imaging surface of the image sensor, and the image sensor and the adjuster may be integrally configured.

In addition, in each of the above embodiments, an operation example of adjusting the transmittance of the electronic ND filter 150 so as to eliminate overexposure is described, but the transmittance may be adjusted so as to eliminate underexposure, not particularly limited to overexposure. For example, a sensitivity of the underexposure region may be increased using an adjuster capable of changing the sensitivity of the pixel. Further, in the electronic ND filter 150, the initial value may be set lower than the maximum value, and the transmittance may be increased according to the part where underexposure occurs.

In addition, in each of the above embodiments, an operation example of the digital camera 100 that detects brightness of the subject from the through image G1 is described. The digital camera 100 of the present embodiment is not particularly limited thereto, and for example, may include a photometric sensor separately from the image sensor 140. In the present embodiment, the photometric sensor of the digital camera 100 may be configured to be able to perform photometry independently from adjustment by the adjuster, for example. The digital camera 100 of the present embodiment can easily adjust the light reception rate in each position on the incident surface of the adjuster using the measurement result by the photometric sensor.

In addition, in each of the above embodiments, the display monitor 220 is exemplified as an example of the display. In the digital camera 100 of the present embodiment, the display is not limited to the display monitor 220, and may be, for example, an electronic view finder (EVF), an output module that outputs a video signal according to the HDMI standard, or the like. For example, in the digital camera 100 of the present embodiment, the display may be configured as the output I/F 270, and may display the through image G1 or the like on the external monitor 300 connected through the output I/F 270. In this case, the user can check the through image G1 or the like displayed in false color on the external monitor 300, for example.

Further, in each of the above embodiments, the digital camera 100 including the optical system 110 and the lens driver 120 is exemplified. The imaging apparatus of the present embodiment does not necessarily include the optical system 110 and/or the lens driver 120, and may be, for example, an interchangeable lens type camera.

Further, in each of the above embodiments, a digital camera is described as an example of the imaging apparatus, but the present disclosure is not limited to this digital camera. The imaging apparatus of the present disclosure can be an electronic apparatus having an image capturing function (e.g., a video camera, a smartphone, a tablet terminal, or the like).

As described above, the embodiments are described as exemplifications of the technique in the present disclosure. To that end, the accompanying drawings and the detailed description are provided. Therefore, the components described in the accompanying drawings and the detailed description may include not only components essential for solving the problem but also components that are not essential for solving the problem in order to exemplify the above technique.

Summary of Aspects

Hereinafter, various aspects according to the present disclosure will be listed.

A first aspect according to the present disclosure is an imaging apparatus including: an image sensor that captures a subject image by receiving incident light to generate image data; an adjuster that adjusts a light reception rate in each position on an incident surface, the light reception rate allowing the image sensor to receive the light, the incident surface being entered by the light and corresponding to an image indicated by the image data; a detector that detects a skin region in the image, the skin region corresponding to a part with skin of a subject indicated by the subject image; and a controller that controls the adjuster to render the light reception rate in a position corresponding to a part of the image on the incident surface different from the light reception rate in another position thereon. The controller compensates exposure of a part corresponding to the skin region detected by the detector to bring luminance in the skin region within a predetermined range.

In a second aspect, in the imaging apparatus according to the first aspect, the controller detects whether the luminance in the detected skin region is within the predetermined range, and compensates exposure of the part corresponding to the skin region when detecting that the luminance is not within the predetermined range.

In a third aspect, in the imaging apparatus according to the first or second aspect, the controller controls the adjuster, according to an amount of light incident in each position on the incident surface, to reduce the light reception rate as the amount of light in each position increases, and compensates exposure of the part corresponding to the skin region in the image in which the light reception rate is adjusted.

In a fourth aspect, the imaging apparatus according to the first or second aspect further includes a user interface capable of inputting a user operation The controller controls the adjuster to adjust, on the incident surface, the light reception rate in a position corresponding to a partial region having excessive or deficient exposure in the image, according to a user operation input in the user interface, and compensates exposure of the part corresponding to the skin region in the image in which the light reception rate is adjusted.

In a fifth aspect, in the imaging apparatus according to any one of the first to fourth aspects, the adjuster adjusts the light reception rate for each position on the incident surface corresponding to each pixel in the image.

In a sixth aspect, in the imaging apparatus according to any one of the first to fifth aspects, by controlling the adjuster to adjust the light reception rate in a position corresponding to the detected skin region on the incident surface, the controller compensates exposure of the part corresponding to the skin region.

In a seventh aspect, the imaging apparatus according to any one of the first to sixth aspects further includes a display that displays the image. The controller controls the display to highlight a region having luminance within the predetermined range in the image according to luminance in each position in the image.

In an eighth aspect, in the imaging apparatus according to any one of the first to seventh aspects, the controller identifies a shadow region indicating a part in shadow in the detected skin region, and further compensates exposure of the part corresponding to the skin region to increase or decrease luminance in the identified shadow region in the detected skin region.

In a ninth aspect, in the imaging apparatus according to any one of the first to eighth aspects, the adjuster includes an electronic neutral density filter that adjusts transmittance of the incident light as the light reception rate in each position on the incident surface.

The idea of the present disclosure can be applied to an electronic apparatus (an imaging apparatus such as a digital camera, a camcorder, or a box camera, a mobile phone, a smartphone, or the like) having an imaging function.

What is claimed is:

1. An imaging apparatus comprising:
an image sensor that captures a subject image by receiving incident light to generate image data;
an adjuster that adjusts a light reception rate in each position on an incident surface, the light reception rate allowing the image sensor to receive the light, the incident surface being entered by the light and corresponding to an image indicated by the image data;
a detector that detects a skin region in the image, the skin region corresponding to a part with skin of a subject indicated by the subject image; and
a controller that controls the adjuster to render the light reception rate in a position corresponding to a part of the image on the incident surface different from the light reception rate in another position thereon,
wherein the controller performs localized exposure compensation in a specific part without changing exposure in another part of the image to bring luminance in the skin region within a predetermined range in a state where the light reception rate has been previously adjusted by the adjuster at least in a position corresponding to a region with overexposure or underexposure in the image, the specific part corresponding to the skin region detected by the detector.

2. The imaging apparatus according to claim 1, wherein the controller
detects whether the luminance in the detected skin region is within the predetermined range, and
performs the localized exposure compensation of in the specific part corresponding to the skin region when detecting that the luminance is not within the predetermined range.

3. The imaging apparatus according to claim 1, wherein the controller
controls the adjuster, according to an amount of light incident in each position on the incident surface, to reduce the light reception rate as the amount of light in each position increases, and
performs the localized exposure compensation in the specific part corresponding to the skin region in the image in which the light reception rate is adjusted.

4. The imaging apparatus according to claim 1, further comprising a user interface capable of inputting a user operation,
wherein the controller
controls the adjuster to adjust, on the incident surface, the light reception rate in a position corresponding to a partial region having excessive or deficient exposure in the image, according to a user operation input in the user interface, and
performs the localized exposure compensation in the specific part corresponding to the skin region in the image in which the light reception rate is adjusted.

5. The imaging apparatus according to claim 1, wherein the adjuster adjusts the light reception rate for each position on the incident surface corresponding to each pixel in the image.

6. The imaging apparatus according to claim 1, wherein by controlling the adjuster to adjust the light reception rate in a position corresponding to the detected skin region on the incident surface, the controller performs the localized exposure compensation in the specific part corresponding to the skin region.

7. The imaging apparatus according to claim 1, further comprising a display that displays the image, wherein the controller controls the display to highlight a region having luminance within the predetermined range in the image according to luminance in each position in the image.

8. The imaging apparatus according to claim 1, wherein the controller identifies a shadow region indicating a part in shadow in the detected skin region, and further performs the localized exposure compensation in the specific part corresponding to the skin region to increase or decrease luminance in the identified shadow region in the detected skin region.

9. The imaging apparatus according to claim 1, wherein the adjuster includes an electronic neutral density filter that adjusts transmittance of the incident light as the light reception rate in each position on the incident surface.

\* \* \* \* \*